United States Patent [19]

Inazumi

[11] Patent Number: 6,151,592
[45] Date of Patent: *Nov. 21, 2000

[54] RECOGNITION APPARATUS USING NEURAL NETWORK, AND LEARNING METHOD THEREFOR

[75] Inventor: Mitsuhiro Inazumi, Suwa, Japan

[73] Assignee: Seiko Epson Corporation, Tokyo, Japan

[*] Notice: This patent is subject to a terminal disclaimer.

[21] Appl. No.: 09/008,321

[22] Filed: Jan. 20, 1998

Related U.S. Application Data

[62] Continuation-in-part of application No. 08/486,617, Jun. 7, 1995, Pat. No. 5,809,461, which is a continuation of application No. 08/150,170, filed as application No. PCT/JP93/00373, Mar. 26, 1993, abandoned.

[51] Int. Cl.$^7$ .................................................. G06F 15/18
[52] U.S. Cl. ................................ 706/16; 706/30; 706/25; 706/39; 704/232
[58] Field of Search .................................... 704/249, 232, 704/236, 246; 706/30, 16, 25, 39

[56] References Cited

U.S. PATENT DOCUMENTS

| | | | |
|---|---|---|---|
| 5,040,215 | 8/1991 | Amano et al. | 704/232 |
| 5,093,899 | 3/1992 | Hiraiwa | 706/25 |
| 5,119,469 | 6/1992 | Alkon et al. | 706/25 |
| 5,150,323 | 9/1992 | Casteloz | 708/801 |
| 5,175,794 | 12/1992 | Tattersall | 704/200 |
| 5,182,794 | 1/1993 | Gasperi et al. | 706/25 |
| 5,185,848 | 2/1993 | Aritsuka et al. | 704/202 |
| 5,297,237 | 3/1994 | Masuoka et al. | 706/25 |
| 5,627,942 | 5/1997 | Nightingale | 706/25 |
| 5,787,393 | 7/1998 | Inazumi | 704/232 |
| 5,809,461 | 9/1998 | Inazumi | 704/232 |

FOREIGN PATENT DOCUMENTS

| | | |
|---|---|---|
| 0 318 858 A2 | 6/1989 | European Pat. Off. . |
| 0 435 282 B1 | 7/1991 | European Pat. Off. . |
| 0 510 632 A2 | 10/1992 | European Pat. Off. . |
| 2-72398 | 3/1990 | Japan . |
| 2-81160 | 3/1990 | Japan . |
| 4-295894 | 10/1992 | Japan . |
| 4-295897 | 10/1992 | Japan . |

OTHER PUBLICATIONS

Lee et al, "On Improving Discrimination Capability of an RNN Based Recognizer", IEEE proceddings of the 4th International Conference on Spoken Language, Oct. 1996.

Tatsumi Watanabe et al., "Study of Learning Methods and Shape of the Learning Surface for Recurrent Neural Networks", *Theses by IEICE*, vol. J74D–II, No. 12, Dec. 25, 1991, pp. 1776–1787.

Mitsuhiro Inazumi et al., "Continuous Spoken Digit Recognition by Recurrent Neural Networks", *Technical Report of IEICE*, SP92–125, Jan. 19, 1993, pp. 17–24.

Mitsuhiro Inazumi et al., "Connected Word Recognition by Recurrent Neural Networks", *Technical Report of IEICE*, SP92–25, Jun. 30, 1992, pp. 9–16.

Ken–ichi Funahashi, "On the Recurrent Neural Networks", *Technical Research Report by IEICE*, SP92–80, Oct. 21, 1992, pp. 51–58.

(List continued on next page.)

*Primary Examiner*—Tariq H. Hafiz
*Assistant Examiner*—George Davis
*Attorney, Agent, or Firm*—Oliff & Berridge, P.L.C.

[57] ABSTRACT

A recognition apparatus and method using a neural network is provided. A neuron-like element stores a value of its inner condition. The neuron-like element also updates a values of its internal status on the basis of an output from the neuron-like element itself, outputs from other neuron-like elements and an external input, and an output value generator a value of its internal status into an external output. Accordingly, the neuron-like element itself can retain the history of input data. This enables the time series data, such as speech, to be processed without providing any special devices in the neural network.

12 Claims, 25 Drawing Sheets

OTHER PUBLICATIONS

Yohji Fukuda, et al., "Phoneme Recognition using Recurrent Neural Networks", *Technical Research Report by IEICE*, NC91–10, May 8, 1991, pp. 71–78.

K.P. Li, et al., "A Whole Word Recurrent Neural Network of Keyword Spotting", *ICASSP*, Mar. 1992, pp. II–81—II–84.

N. Z. Hakim et al., "Cursive Script Online Character Recognition with a Recurrent Neural Model", *IJCNN*, Jun. 1992, pp. III–711—III–716.

Tony Robinson, "A Real–Time Recurrent Error Propagation Network Word Recognition System", *ICASSP*, vol. 1, Mar. 23–26, 1992 San Francisco, CA, US, pp. 617–620.

Thomas M. English et al., "Back–Propagation Training of a Neural Network for Word Spotting", *ICASSP*, vol. 2, Mar. 23–26, 1992 San Francisco, CA, US, pp. 357–360.

Patent Abstracts of Japan, vol. 16, No. 75 (p. 1316), Feb. 24, 1992, JP–A–03 265077 (Shigeki) Nov. 26, 1991 (Abstract).

Zuqiang Zhao, "Connectionist Training of Non–Linear Hidden Markov Models for Speech Recognition", *IJCNN*, 1991, vol. 2, Nov. 18–21, 1991 Singapore, SG, pp. 1647–1652.

Fabio Greco et al., "A Recurrent Time–Delay Neural Network for Improved Phoneme Recognition", *ICASSP*, 1991, vol. 1, May 14–17, 1991, Toronto, Canada, pp. 81–84.

H.U. Bauer et al., "Nonlinear Dynamics of Feedback Multilayer Perceptrons", *Physical Review A*, vol. 42, No. 4, Aug. 15, 1990, US, pp. 2401–2408.

John Hertz, "Introduction to the Theory of Neural Computation," Santa Fe Institute Studies in the Sciences of Complexity, Lecture Notes vol. I, Addision–Wesley, 1991.

IOOSS, "From Lattices of Phoneme To Sentences: A Recurrent Network Approach", International Joint Conference on Neural Nets, Jul. 8–14, 1991, pp. 883–838, vol. 2.

POSITIVE DATA

NEGATIVE DATA

FIG. 25

|  | INSERTION | OMISSION | CONFUSED |
|---|---|---|---|
| MAU | 1.5 | 0.9 | 6.6 |
| FSU | 1.5 | 1.9 | 3.4 (%) |

FIG. 26

|  | INSERTION | OMISSION | CONFUSED |
|---|---|---|---|
| MHT | 5.3 | 2.3 | 6.8 |
| MMS | 2.7 | 7.0 | 16.0 |
| MMY | 1.7 | 0.5 | 5.7 |
| MNM | 0.5 | 60.0 | 6.8 |
| MTK | 4.8 | 1.4 | 10.9 |
| MXM | 14.3 | 0.9 | 17.4 |
| FKN | 2.6 | 4.2 | 9.7 |
| FKS | 4.3 | 1.4 | 11.6 |
| FYN | 0.5 | 0.5 | 5.3 (%) |

FIG. 27

| | INSERTION | OMISSION | CONFUSED |
|---|---|---|---|
| MAU | 1.2 | 1.9 | 7.2 |
| FSU | 1.9 | 0.5 | 3.5 |
| MHT | 7.4 | 0.2 | 10.3 |
| MMS | 3.1 | 10.0 | 13.8 |
| MMY | 1.7 | 0.5 | 5.5 |
| MNM | 0.3 | 88.6 | 6.6 |
| MTK | 6.6 | 0.5 | 10.3 |
| MXM | 27.1 | 1.9 | 22.7 |
| FKN | 3.1 | 0.7 | 6.5 |
| FKS | 7.0 | 0.7 | 11.1 |
| FYN | 0.1 | 0.2 | 5.3 (%) |

RECOGNITION APPARATUS USING NEURAL NETWORK, AND LEARNING METHOD THEREFOR

CROSS REFERENCE TO RELATED APPLICATIONS

This application is a Continuation-in-Part of application Ser. No. 08/486,617 filed Jun. 7, 1995, U.S. Pat. No. 5,809,461, which is a Continuation of application Ser. No. 08/150,170 filed Nov. 29, 1993, now abandoned which is a 371 of International Application PCT/JP93/00373, filed Mar. 26, 1993. The entire disclosure of the prior applications is hereby incorporated by reference herein in its entirety.

BACKGROUND OF THE INVENTION

1. Field of the Invention

The present invention relates to a recognition apparatus using a neural network, and its learning method therefor. Unlike the prior art, the present invention will neither require the start and end edges of input data when time series data is to be processed, nor process all the possible combinations of the start and end edges. However, the present invention makes it possible to process the time series data precisely, using simplified hardware which comprises neuron elements capable of holding past history of input data.

The present invention also relates to a learning method neural network to do such a process.

2. Description of the Related Art

Several data recognition methods have practically been used particularly to learn and recognize the category of time series data. Such methods include the Dynamic Programming (DP) Method, the Hidden Markov Model (HMM) Method, and the Back Propagation Learning Rule and the Multi-Layered Perceptron (MLP) Neural Network Method. These methods are described, for example, in NAKAGAWA Seiichi, "Speech Recognition by Stochastic Model" published by the Institute of Electronics, Information and Communication Engineers and in NAKAGAWA, SHIKANO and TOHKURA, "Speech, Auditory Perception and Neural Network Model" published by Ohm Co., Ltd.

The common problem to the DP and HMM methods is that they require the start and end edges in both the teacher data and input data to be recognized. One technique of processing data apparently not depending on the start and end edges thereof is to find the start and end edges providing the best result in a trial-and-error manner. Where it is considered to detect data parts belonging to a category from input data having a length N, there are N number of possible start edges, and there also are N number of possible end edges. That is, combinations of start and end edge patterns to the order of $N_2$ can be considered to be possible. Therefore, such a technique must recognize and process all the great number of combinations. This consumes huge processing time.

The aforementioned technique has a more essential problem due to the fact that the start and end edges of the input data are assumed than the quantitative problem of the huge number of combinations. More particularly, the start and end edges of the input data are self-evident if the input data only contains a single data belonging to a category. However, the start and end edges of the input data cannot easily and clearly be bounded if the input data includes successive data parts belonging to more than one category. Particularly, time series data such as speech data or the like does not have definite boundaries at the start and end edges, with data parts belonging to two adjacent categories being connected to each other through an overlapping transition region. Accordingly, the assumption of the start and end data edges raises a very large problem in accuracy.

On the other hand, the MLP method does not require such an assumption. Instead, the MLP method raises another problem with respect to the start and end edges of the input data in that the range of the input data must be specified. In other words, the MLP method is basically for recognizing static data. Thus, the MLP method can recognize time series data only when input data within a length of time is used while time information is equivalently processed. The length of time must be fixed due to the composition of the MLP method.

However, the length of the time series data greatly varies from one category to another, and also within the same category. For example, the average length of vowels, which are long phonemes, is ten or more times longer than that of plosives, which are short phonemes. Even in the same phonemes, the length can fluctuate over two times in actual speech. Even if the input range of data is set to be the average length, the input data of a short phoneme to be recognized will include a number of data other than the data to be recognized, and the input data of a long phoneme will include only a part of the data to be recognized. Such things cause the recognition ability to be reduced. Even though input length is appropriately set for each phoneme, it will not solve the problem since the length of each phoneme itself varies. Such problems are generally found in time series information.

SUMMARY OF THE INVENTION

As described, the DP and HMM methods require the start and end edges of data to be recognized, and the MLP method requires the start and end edges of the input range on learning. However, the start and end edges of the time series information cannot definitely be bounded due to the nature of the information. Even if the start and end edges are forcibly assumed, the recognition ability will be reduced. In order to apparently relieve it, all the combinations of start and end edges must be processed, resulting in a huge amount of processing time.

On the contrary, the present invention provides a recognition apparatus using a neural network which may be applied to recognizing input signals, such as those associated with characters, figures, handwriting input data, etc. comprising:

1) Neuron elements, each of the neuron elements comprising internal state value storage means for storing an internal state value, internal state value updating means for updating the internal state value stored in said internal state value storage means on the basis of a current internal state value stored in said internal state value storage means and an input value to said neuron element, and output value generating means for converting an output of a said internal state value storage means into an external output value.

2) The internal state value updating means may be formed as weighted accumulation means for performing the weighted accumulation of said input values and said internal state values. The internal state value storage means may be formed as integration means for integrating the values accumulated by said weighted accumulation means. The output value generating means may be formed as output value limiting means for converting a value obtained by said integrating means into a value between upper and lower preset limits.

3) The internal state value updating means may be formed to update the internal state value into a value which satisfies the following formula:

$$\tau_i \frac{d}{dt} X_i = -X_i + \Sigma_j Z_j$$

where $X_i$ is the internal state value of the i-th neuron elements in said neural network, $\tau_i$ is a time constant, and $Z_j$ (j ranges between O and n: n is O or a natural number) is said weighted input value to said neuron element.

4) In the recognition apparatus defined in any one of items 1) to 3), the weighted input value $Z_j$ to the i-th neuron element may include the weighted output of the i-th neuron element itself.

5) In the recognition apparatus defined in any one of items 1) to 4), the weighted input value $Z_j$ to the i-th neuron element may also include the weighted output of any other neuron element in said neural network.

6) In the recognition apparatus defined in any one of items 1) to 5), the weighted input value $Z_j$ to the i-th neuron element may also include any data provided from the outside of said neural network.

7) In the recognition apparatus defined in any one of items 1) to 6), the weighted input value $Z_j$ to the i-th neuron element may also include a weighted and fixed value.

8) In the recognition apparatus defined in any one of items 1) to 7), the output value generating means may be formed to have an output of symmetrical range in positive and negative directions.

9) In the recognition apparatus defined in any one of items 1) to 8), the neural network may be formed to have at least two outputs: positive and negative outputs.

10) In the recognition apparatus defined in any one of items 1) to 9), the recognition apparatus may comprise speech feature extracting means for extracting the feature of an input to be recognized and for providing the extracted value to said neural network, recognition result output means for converting the output value of said neural network into a recognition result, and internal state value initializing means for providing a preset initial value to the internal state value storage means of each neuron element comprised by said neural network.

11) The recognition apparatus as defined in item 10) comprising: background noise input means for inputting the background noise to said neural network, and stable state detecting means for detecting the stable state from the output of said neural network and for outputting a signal to change the preset initial internal state value to an initial internal state value setting means on the basis of said stable state detection.

The learning method for the recognition apparatus using neural network according to the present invention includes the following features:

12) The recognition apparatus as defined in item 10) or 11) further includes a learning section for causing said neural network to learn. The learning section comprises input data storage means for storing input learning data, input data selection means for selecting an input learning data from said input data storage means, output data storage means for storing output learning data, output data selection means for selecting an output learning data depending on the selected input data and chains of data including the selected data, and learning control means for inputting the selected input learning data to said feature extracting means and for controlling the learning in said neural network. The learning control means is formed to respond to the outputs of said neural network and output data selection means to change the weightings at the connections of said neuron elements.

13) In item 12), said input data storage means has a plurality of categories, said output data storage means has one category corresponding to each of the categories in said input data storage means, said input data selection means selects a plurality of data to be learned from the categories of said input data storage means, and said output data selection means selects an output learning data corresponding to the input learning data selected by said input data selection means. Said learning control means has input data connecting means for connecting the plurality of data selected by said input data selection means into a single input data, and output data connecting means for connecting the output learning data selected by said output data selection means into a single output data. The learning control means may be formed to input said connected input learning data to the speech feature extracting means and to change the weightings at the connections of said neuron elements on the basis of the outputs of said neural network and output data connecting means.

14) In item 13), the number of said categories can be two.

15) In items 12) to 14), the learning section comprises noise data storage means for storing noise data, and noise overlaying means for overlaying said selected learning data with the noise selected from said noise data storage means, the input data overlaid with the noise by said noise overlaying means being used to cause said neural network to learn.

16) In item 15), the learning may be repeated while shifting said background noise to different overlaying positions.

17) In item 15), the learning may be performed by first causing the neural network to learn an input data not overlaid with the background noise, and thereafter to learn the same data overlaid with the background noise.

According to the present invention, the recognition apparatus using neural network, and learning method therefor have the following advantages:

1) The processing speed may greatly be increased because data input is required only once, although the prior art requires a processing time proportional to the square of length N of the input.

2) A memory used to store input data may greatly be reduced in capacity.

3) No normalization of results is required.

4) The continuous processing can easily be carried out.

5) The accuracy can sufficiently be obtained even with integer type data representation.

6) The recognition results can be obtained with very high accuracy by combining the positive and negative outputs with each other.

7) Any information of multiple number of outputs can be outputted.

8) Various characteristics such as noise-resistance can easily be improved.

9) The recognition apparatus can self-organizingly treat phenomena with various time scales by causing the apparatus to learn.

10) Organizations optimally placing the associative ability and data compression/expansion ability of NN (neural network) can easily be formed for intended purposes.

11) The learning can very easily be made with a very reduced number of trial-and-error parts.

BRIEF DESCRIPTION OF THE DRAWINGS

The preferred embodiments of this invention will be described in detail with reference to the following figures, wherein:

FIG. 25 is a table showing results obtained when unknown words are provided to the neural network that has learned according to the learning method of the present invention;

FIG. 26 is a table showing results obtained when the same processing as in FIG. 25 is carried out to an unknown speaker;

FIG. 27 is a table showing results obtained when the same processing as in FIG. 26 is carried out with background noise;

DESCRIPTION OF PREFERRED EMBODIMENTS

Figure 1:
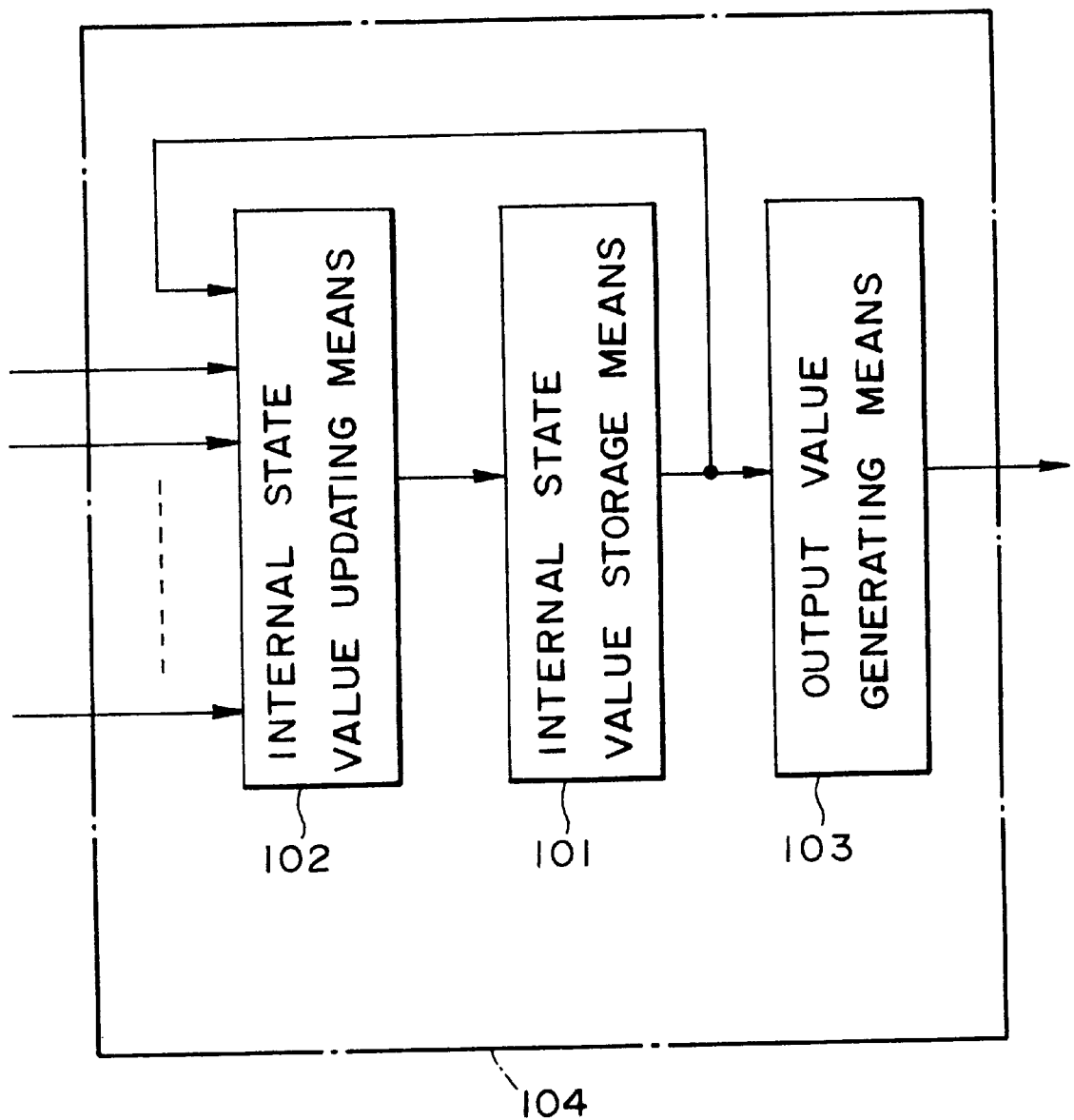
FIG. 1 is a view of a neuron element used to form a neutral network according to the present invention.

Referring to FIG. 1, there is diagrammatically shown the function of a neuron element (hereinafter referred to as a "node") which is used to form a NN (neural network) according to the present invention. In the figure, a numeral 104 designates the node generally, 101 designates an internal state value storage means, 102 designates an internal state value updating means to update the internal state responsive to a current internal state value stored in the internal state value storage means 101 and an input value to the node, and 103 designates an output value generating means for converting the internal state value into an external output.

Figure 2:
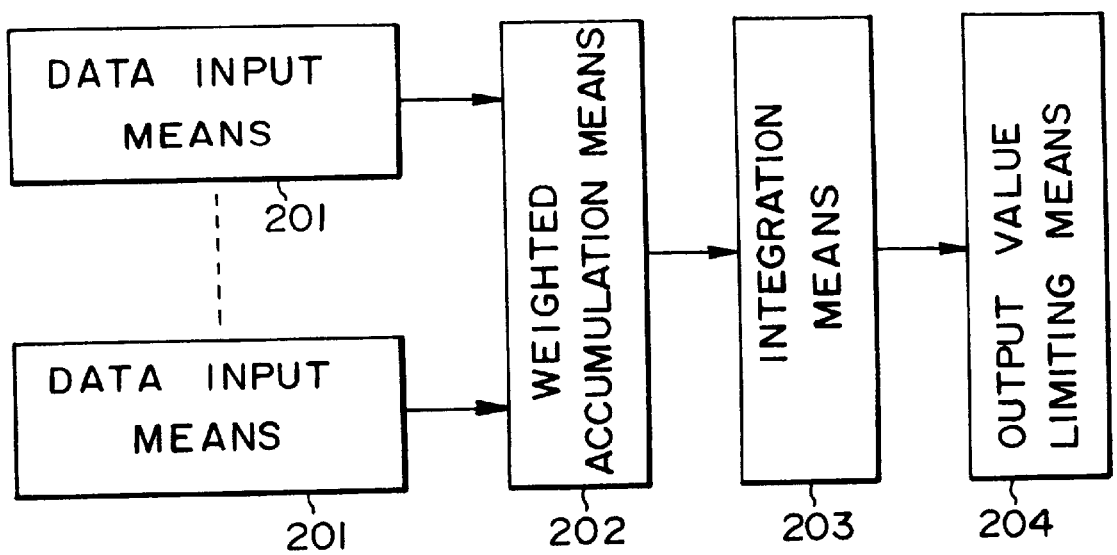
FIG. 2 is a view showing the neuron element of FIG. 1 in actual functional blocks.

FIG. 2 shows the detailed function of the node shown in FIG. 1. In FIG. 2, reference numeral 201 designates data input means; 202 designates weighted accumulation means for weighting and accumulating data input values from the data input means 201; 203 designates integration means for integrating the accumulated data values; and 204 designates output value limiting means for converting a value obtained by the integration into a value within a preset range, respectively.

Figure 3:
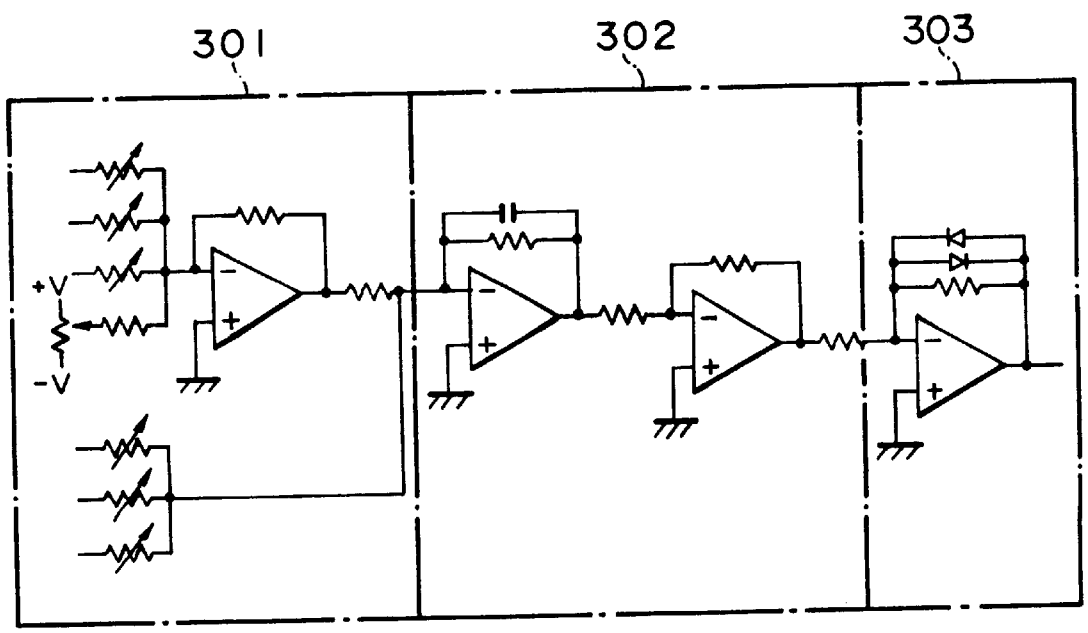
FIG. 3 is a view obtained by replacing blocks in the arrangement of FIG. 2 by electric circuits.

FIG. 3 shows an example of an electronic circuit in the arrangement of FIG. 2. In FIG. 3, reference numeral 301 designates both the input means and weighted accumulation means in FIG. 2; 302 designates the integration means; and 303 designates the output value limiting means.

Figure 28:
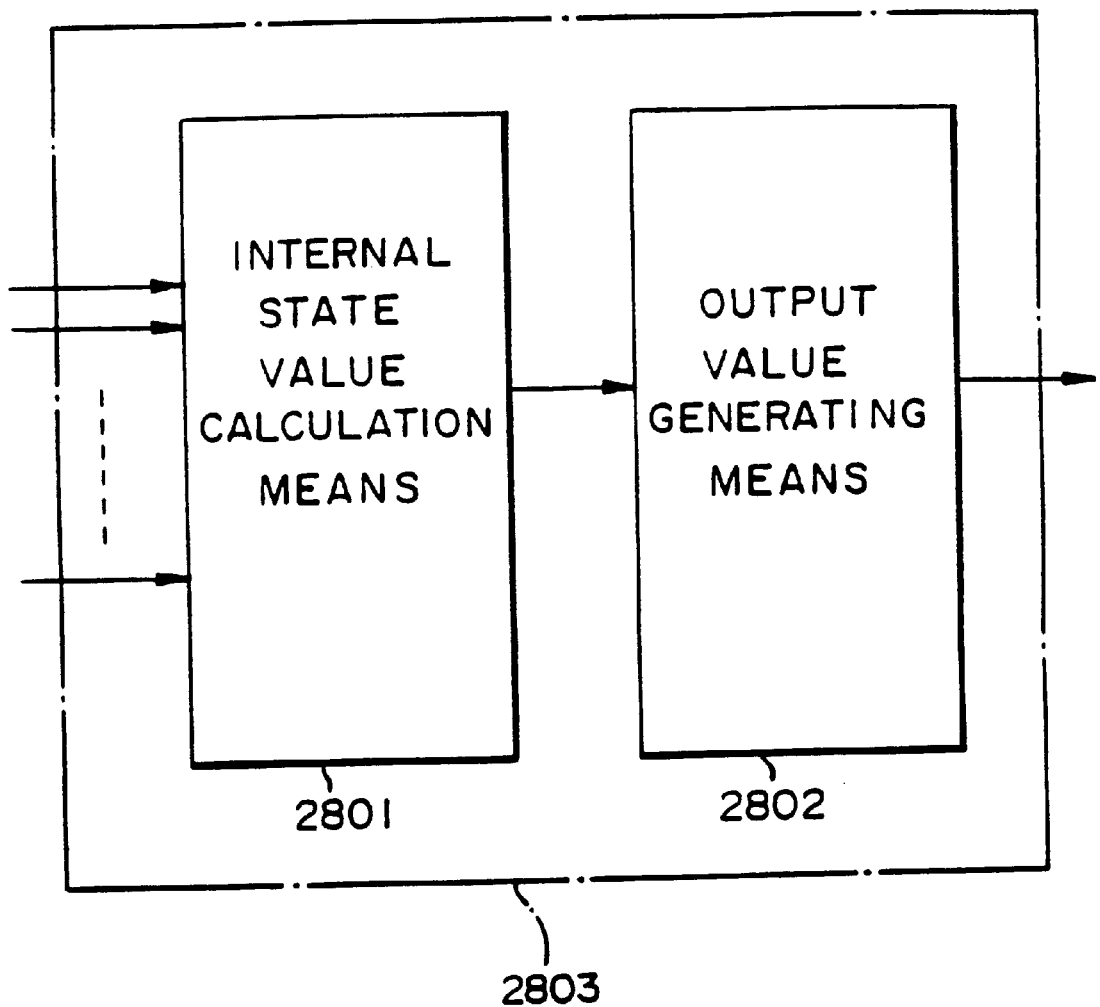
FIG. 28 is a view showing a neuron element of the prior art.

On the other hand, FIG. 28 diagrammatically shows the function of a node used to form a NN (neural network) using the prior art MLP method. In the figure, 2803 designates the node generally, 2801 designates an internal state value calculation means for computing the internal state value, and 2802 designates output value generating means for converting the internal state value computed by 2801 into an external output.

Figure 29:
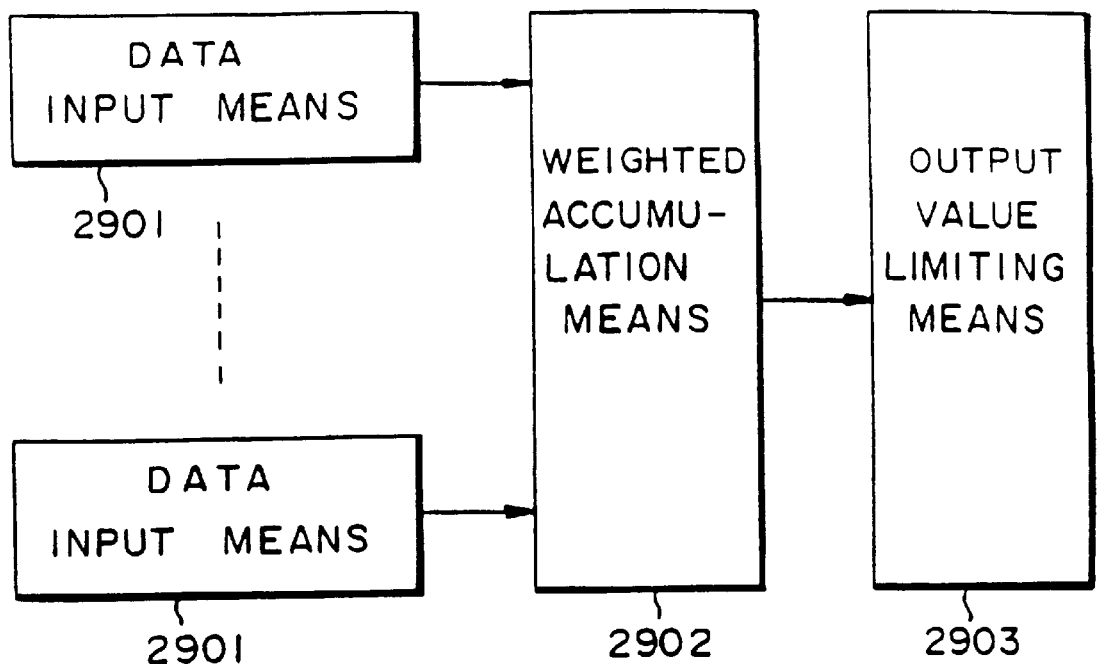
FIG. 29 is a view showing the neuron element of FIG. 28 in actual functional blocks.

FIG. 29 similarly shows the functional arrangement of the prior art node shown in FIG. 28. In FIG. 29, reference numeral 2901 designates a data input means; 2902 designates a weighted accumulation means for weighting and accumulating data input values from the various data input means 2901; and 2903 designates output value limiting means for converting the accumulated data values into a value within a preset range.

Figure 30:
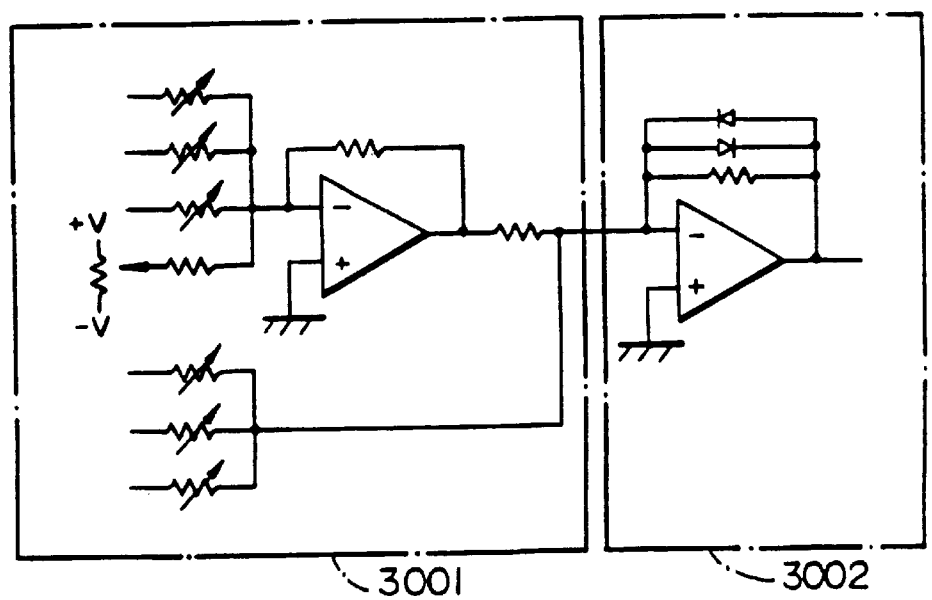
FIG. 30 is a view obtained by replacing blocks in the arrangement of FIG. 29 by an electric circuit.

FIG. 30 shows an example of an electronic circuit for the arrangement of FIG. 29. In FIG. 30, reference numeral 3001 designates both the data input means and weighted accumulation means of FIG. 29; and 3002 designates the output value limiting means.

As will be apparent from FIGS. 1–3 and 28–30, the node of the present invention includes the integration means which can not be found in the node of the prior art. The node of the prior art is static in that its output depends only on the input at that time. On the contrary, the node of the present invention can be said to be dynamic in that the past history of data inputted into that node is converted into and held as an integrated value on which the output of the node depends.

In other words, the neural network using the static nodes of the prior art requires taking the temporal structure of data on the neural network structure if it is wanted to process time series data. On the contrary, the neural network using the dynamic nodes of the present invention can process time series data in the node itself without depending on the neural network structure.

More concretely, the processing of time series data by the neural network of the prior art requires any suitable manner of developing the temporal information into spatial information, such as a method of connecting data inputted at a plurality of timings into a single input data. To this end, it is required to provide a hardware and a process for storing and controlling the connected data. Alternatively, it may be required to provide a special context element for storing the aforementioned information depending on time. Any suitable hardware and a process for controlling this context is further required.

On the contrary, the neural network of the present invention does not require any special structure because the context information and others are stored as integrated values in the interior of each of the elements. Therefore, the input of data can sufficiently be carried out according to the simplest data input manner in that the data of respective timing is inputted at the respective timing. The present invention does not require any specific hardware or a process for processing the temporal information.

The actual operations of the node and the neural network defined by a plurality of such nodes according to the present invention will be described below. It is now assumed that the internal state value of the node is X and the output value thereof is Y. It is also assumed that as the values X and Y are changed with time, the current internal state value is $X_{curr}$; the updated internal state value is $X_{next}$; and an input value to the node during the updating operation is $Z_i$ (i ranges from zero to n:n is the number of inputs to that node). When the operation of the internal state value updating means is formally represented by a function G, the updated internal state value $X_{next}$ can be represented by:

$$X_{next} = G(X_{curr}, Z_0, \ldots Z_i, Z_n) \quad (1)$$

The concrete form of this formula (1) can be considered to be of any one of various forms, although it may be the following formula (2) using the first order differential equation:

$$\tau_i \frac{d}{dt} X_i = -X_i + \Sigma_j Z_j \quad (2)$$

where $\tau_i$ is a time constant.

The input value $Z_j$ will be defined in more detail. The input value are considered to include: (1) the output of a input node itself multiplied by a connecting weight; (2) the output of another node multiplied by a connecting weight; (3) a fixed output value multiplied by a connecting weight to provide a bias equivalently to the internal state value updating means; and (4) an external input provided to the node from the outside of the neural network. Thus, the updating of the internal state value in the i-th node relative to such an input value $Z_j$ is considered. The formula (2) can be rewritten into a more specific form as follows:

$$\tau_i \frac{d}{dt} X_i = -X_i + \Sigma_j W_{ij} Y_j + \theta_i + D_i \quad (3)$$

where the internal state value is $X_i$; the output of a node is $Y_j$; the connecting weight for connecting the output of the j-th node to the input of the i-th node is $W_{ij}$; the bias value is $\theta_i$; and the external input value to the i-th node is $D_i$.

When the internal state value in the node determined in such a manner at a moment is X and if the operation of the output value generating means is formally represented by a function F, the output Y of the node can be represented by:

$$Y = F(X) \quad (4)$$

A specific form of the function F may be a sigmoid (logistic) function of a positive-negative symmetric output as shown by the following formula:

$$Y_i = \frac{2}{1 + \exp(X_i)} - 1 \quad (5)$$

However, such a function expression is not essential and may be a simpler linear transform, a threshold function, etc.

According to such formulae, the time series of the output Y of the neural network constructed in accordance with the present invention can be calculated.

Figure 4:
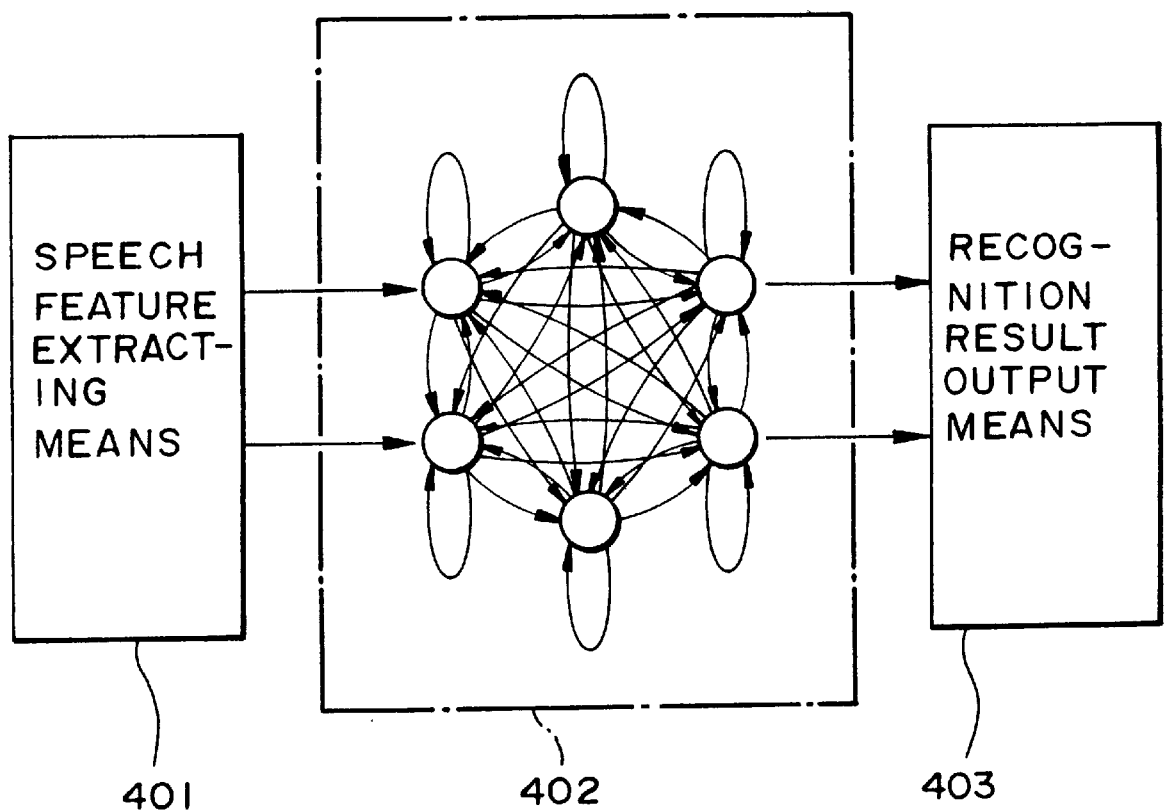
FIG. 4 is a view of a recognition apparatus which uses a neural network constructed by neuron elements according to the present invention.

FIG. 4 shows one embodiment of a speech recognition apparatus using a neural network which is constructed by such nodes according to the present invention. In the figure, 401 designates speech feature extracting means, 402 designates a neural network constructed by nodes according to the present invention, and 403 designates recognition result output means. Outputs extracted by the speech feature extracting means are inputted into two nodes. Thus, the neural network is of an entire connecting type in which any one node is connected with all the other nodes. The neural network provides two outputs to the recognition result output means. The neural network of the present invention may set any number of outputs. If a word is to be recognized, therefore, two outputs, positive and negative outputs can be provided. The recognition results of these outputs can collectively be judged to increase the accuracy in recognition. The number of inputs and outputs relative to the neural network need not be limited to be limited respectively to two as in FIG. 4, but may be set at any number.

FIGS. 5–9 show a variety of other neural network forms constructed by the nodes of the present invention.

Figure 5:
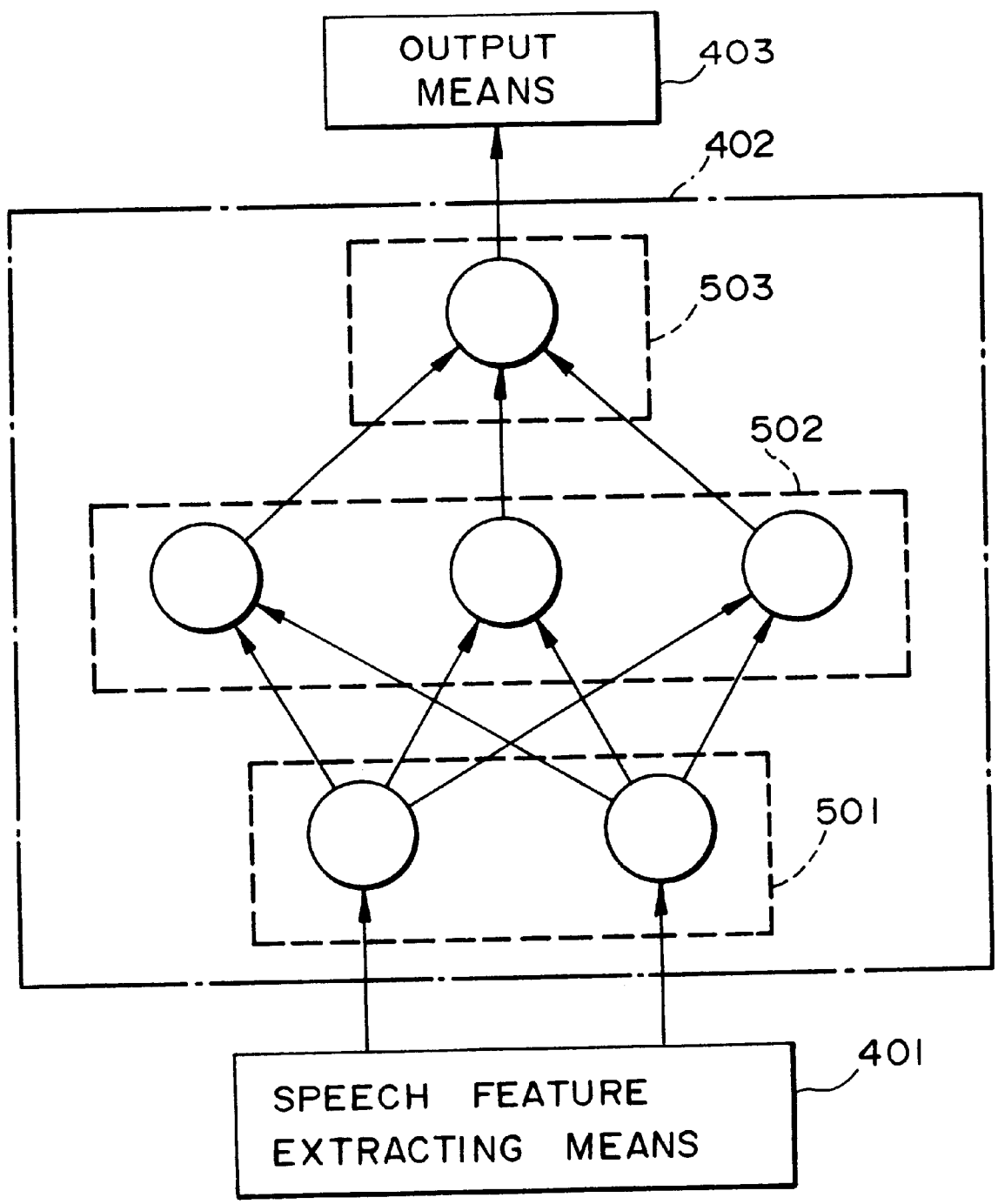
FIG. 5 is a view showing the neural network of FIG. 4 formed into a three-layered schematic structure.

FIG. 5 shows a form in which only the neural network 402 shown in FIG. 4 is modified. Such a neural network 402 includes an input layer 501, a hidden layer 502 and an output layer 503. Such an arrangement is apparently the same as in the MLP method of the prior art. However, in the present invention, the neural network constructed by the nodes is different from such a feed-forward type network as in the prior art in which the value of the input layer is first determined, the value of the hidden layer using the input layer value as an input is then determined, and the values of the respective layers until the output layer are successively determined.

Because the node can hold its own internal state value, the neural network using the nodes of the present invention can recognize the time series data to provide the same result as in the prior art, without need of such a context layer as in the prior art. The neural network of the present invention can also perform the parallel processing more efficiently than the MLP method of the prior art because the outputs of all the layers are simultaneously determined.

Figure 10A:
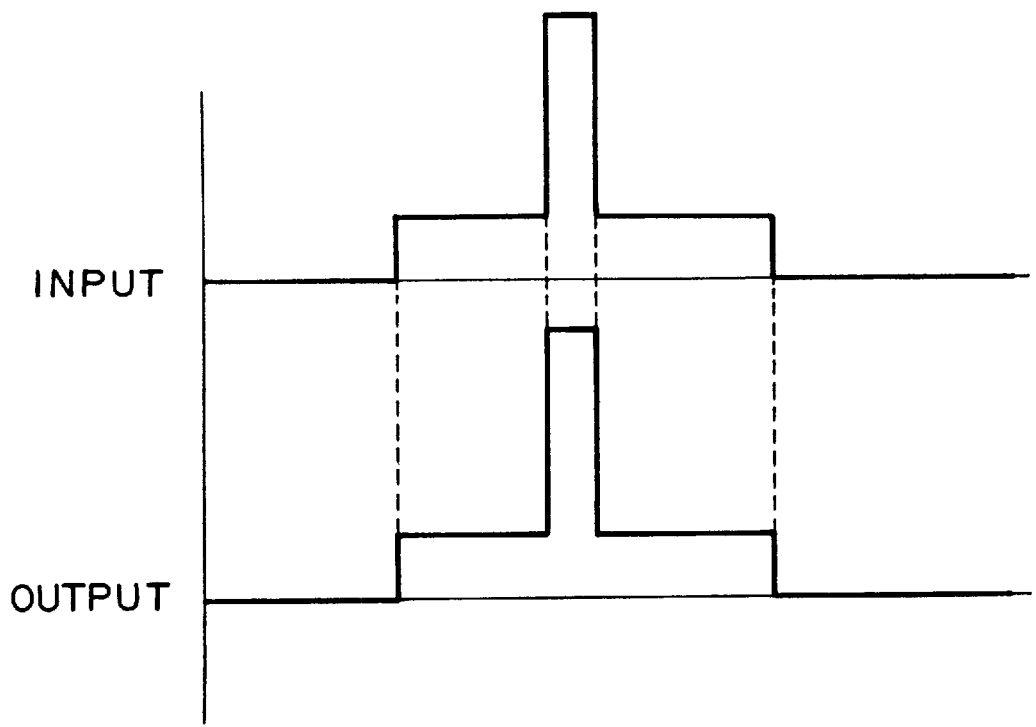
FIGS. 10a and 10b are a view illustrating the noise-resistant property of the recognition apparatus of the present invention.

Further, the neural network using the nodes of the present invention has an improved noise resistance. FIG. 10(a) shows the correspondence between the input and output in the node according to the simple MLP method of the prior art. When a signal comprising an input of square waveform overlaid with a spiked noise is inputted, the waveform substantially equivalent to that of the input signal appears at the output, as will be apparent from FIG. 10(a). Thus, the node of the MLP method will be affected directly by the noise since the input is simply reflected to the output.

Figure 10B:
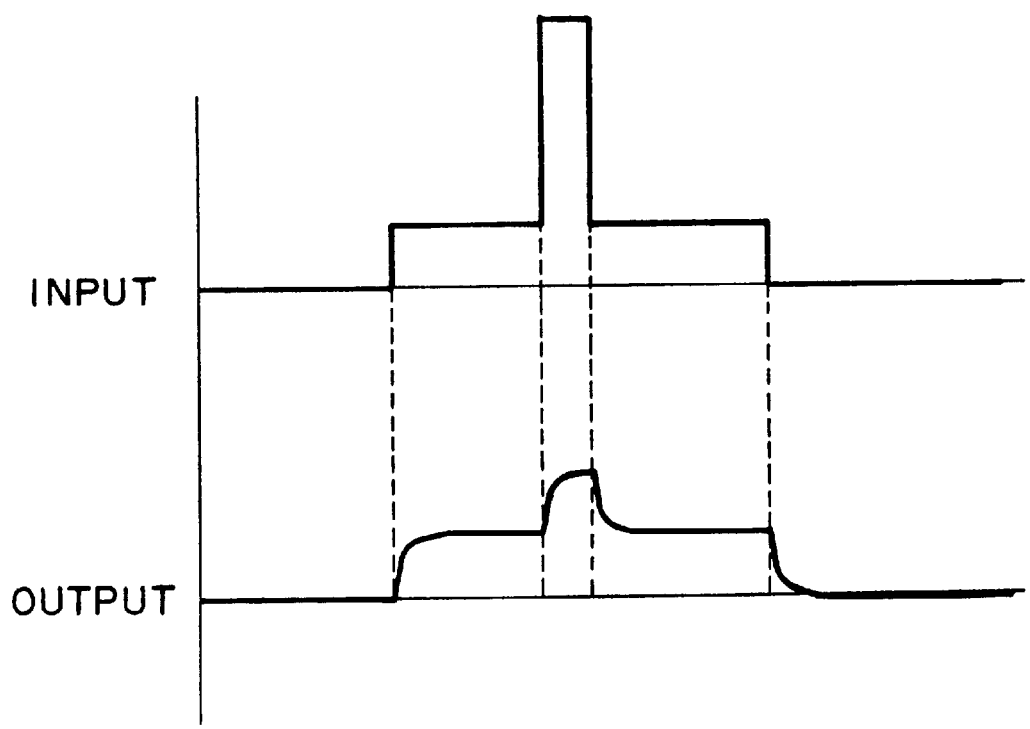

However, the node of the present invention stores the temporal history as an internal state value. The next internal state value and output value are determined as a function of the current internal state value and input. Even if the input is overlaid with such a spiked noise as in FIG. 10(a), the spiked waveform is dulled with reduction of its effect, as shown in FIG. 10(b). As a result, the present invention can provide an improved noise resistance.

The noise resistance can be somewhat accomplished even by the prior art having the context layer. However, the prior art must be provided with an external node having a special structure for holding the past history information as some of the nodes used to form the neural network. Therefore, the noise resistance of the prior art is inferior to that of the present invention in which each of all the nodes holds its own past history information as an internal state value.

Figure 6:
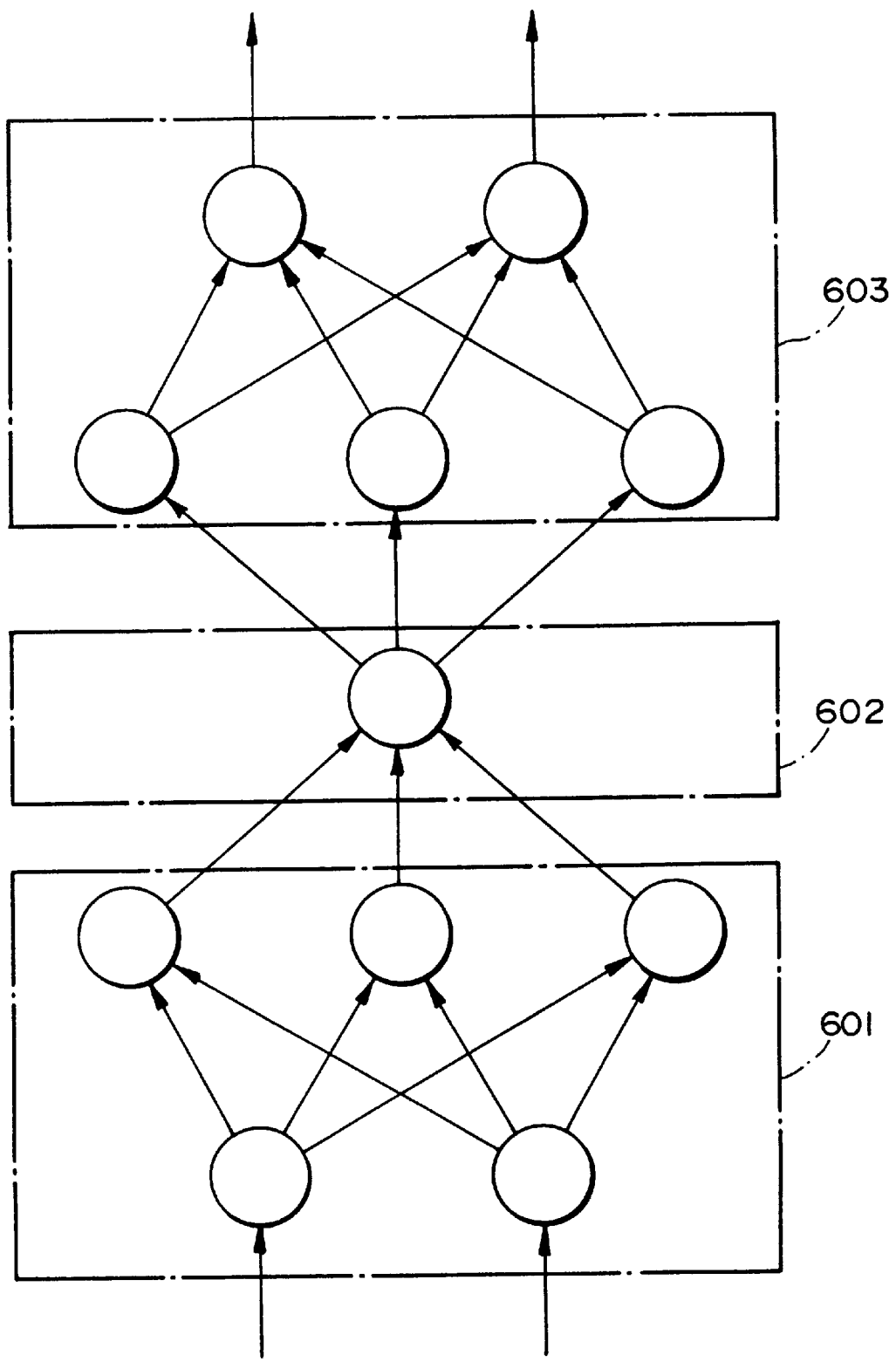
FIG. 6 is a view showing the neural network of FIG. 5 formed into a increased number of layered structure.

As a next example, FIG. 6 shows a multi-layer neural network obtained by increasing the number of layers in such a neural network as in FIG. 5 to form the neural network into a sandglass configuration. In FIG. 6, 601 designates the neural network comprising a feature extracting (or information compressing) network, 602 designates a transmission network and 603 designates a recognizing (or information expanding) network. The neural network of FIG. 6 is also apparently similar to the MLP method of the prior art. However, its operation is entirely different from that of the prior art, as described. In such an arrangement, the functions of the feature extracting (or information compressing) NN (neural network) and recognizing (or information expanding) networks taking in the time series effect can be formed into modules to provide a speech recognition apparatus without losing advantages of the present invention.

Figure 7:
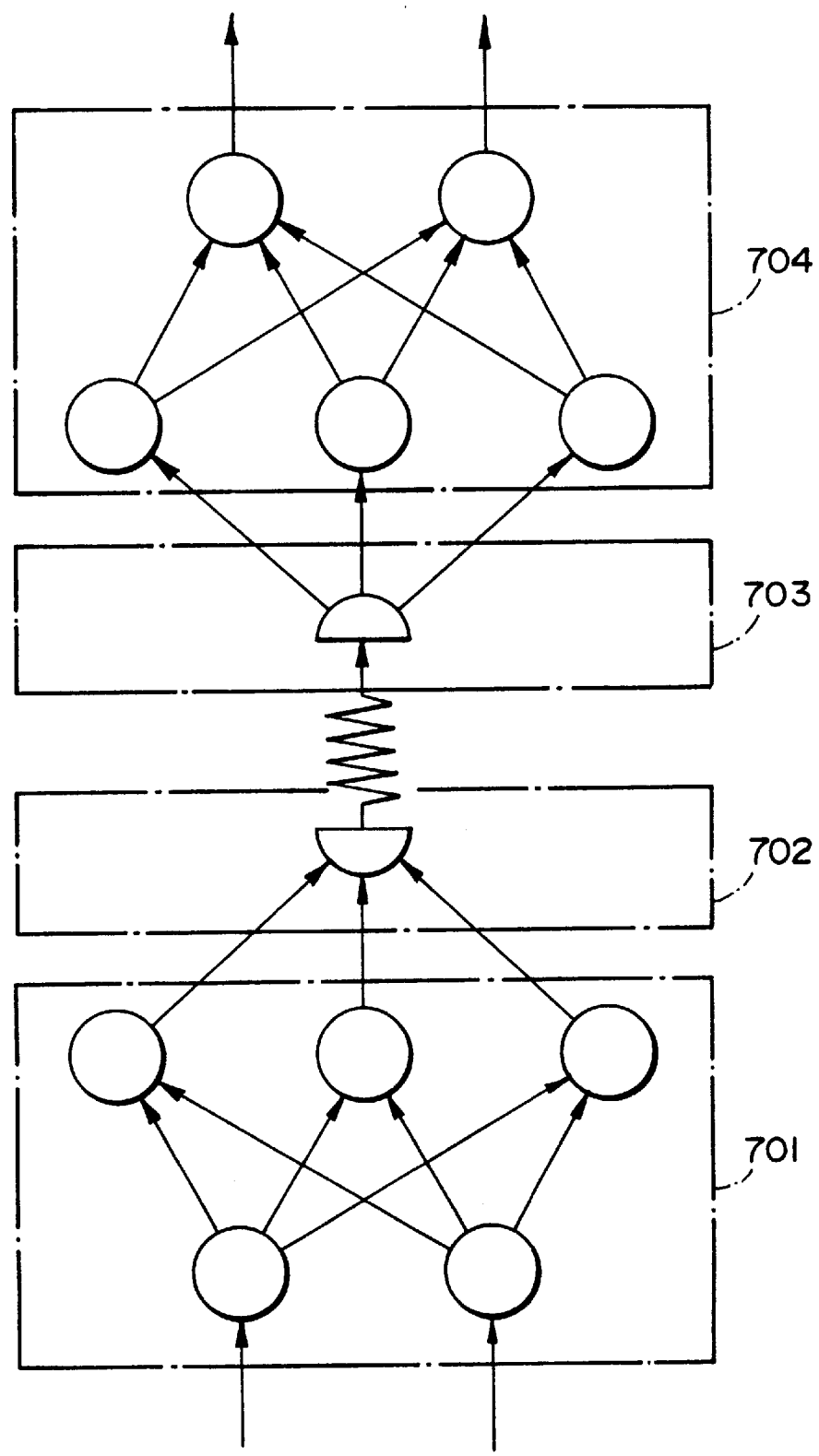
FIG. 7 is a view showing the division of the transmission network shown in FIG. 6.

The transmission network 602 of FIG. 6 can be divided into an information transmitting function 702 and an information receiving function 703, as shown in FIG. 7. A wavy line between the functions 702 and 703 indicates that these functions may be separated from each other through space and/or time. If the wavy line represents spatial distance such as a transmission line, it will represent a speech compressing and transmitting device. If the wavy line represents the length of a time, it will represent a speech compressing and recording device. It is of course that an object to be compressed herein is not limited to speech, but may be more general information. It is needless to say that the recognizing process is a process of information compression in a broader sense.

The arrangement of FIG. 7 has the same advantages as described hereinbefore. For example, the noise resistance described with respect to FIG. 10(a) and 10(b) can also protect the neural network from the mis-transmission and noise in the transmission line or the defect of or degradation of a recording medium.

Figure 8:
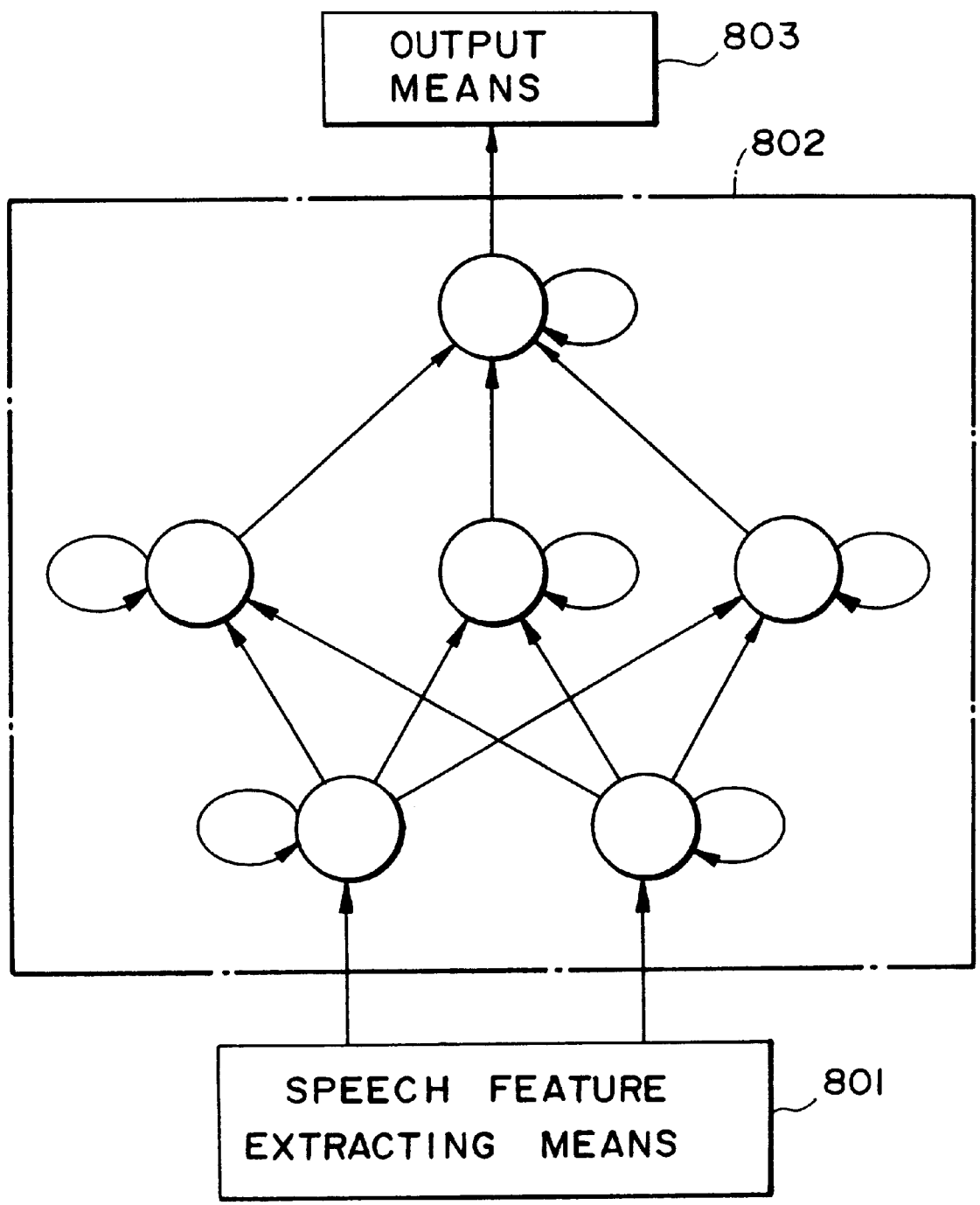
FIG. 8 is a view of a neural network having an autoregressive loop.

FIG. 8 shows a simplified modification of the neural network shown in FIG. 4. The neural network has an autoregressive loop which can handle events within a widened range of time. More particularly, the presence of the autoregressive loop approximately corresponds to replacing the time constant τ in the system by the following formula:

$$\tau/(1-W) \qquad (6)$$

where W is the connecting weight of the autoregressive loop portion in an input value Z.

The connecting weight W can be modified by a learning process, which will be described later, to optimize the time scale in the response of the system for learning data. The method of the prior art using the context layer cannot self-organizingly optimize the time scale by learning. Thus, the network must manually be set for time scale.

Figure 11A:
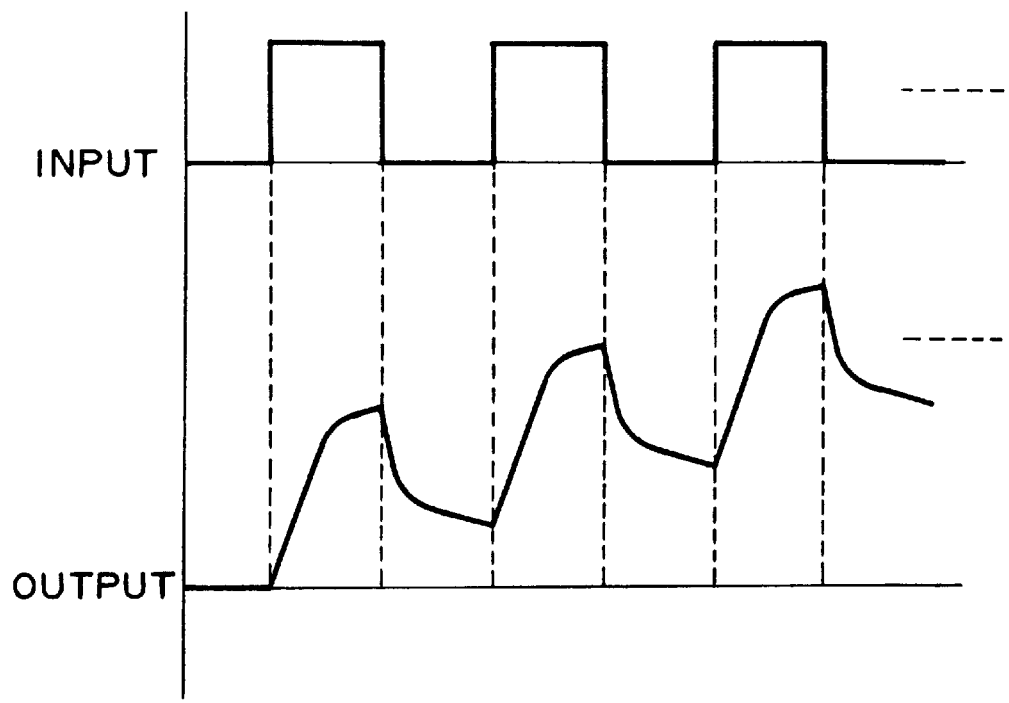
FIGS. 11a and 11b are a view illustrating the learning effect of the recognition apparatus of the present invention with respect to time scale.
Figure 11B:
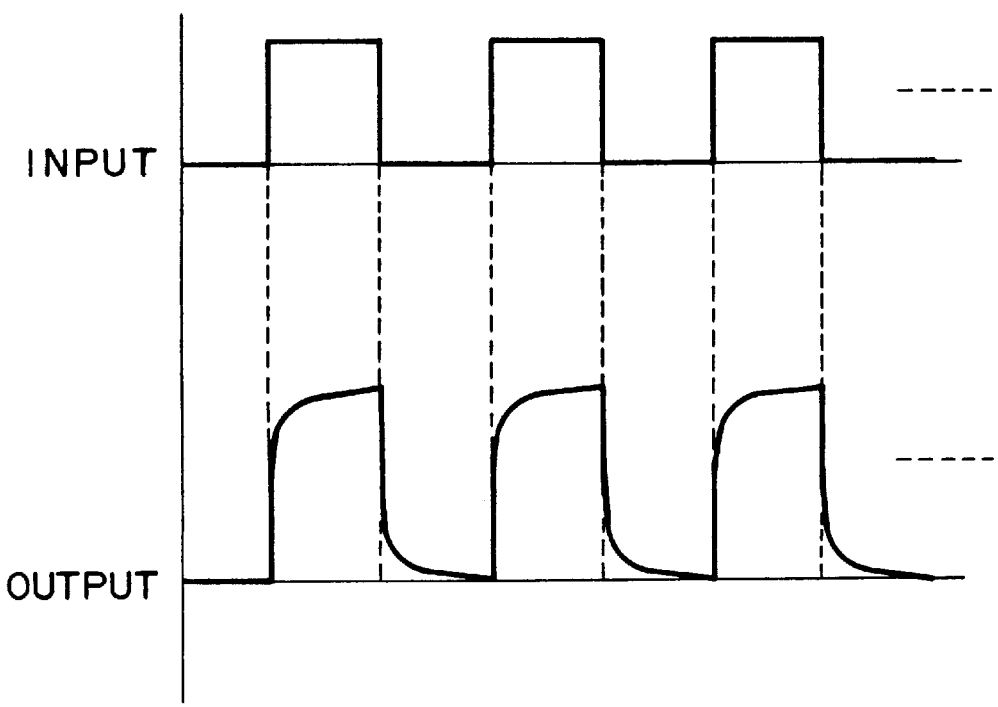

FIGS. 11(a) and 11(b) show the concept of such an advantage in the present invention. It is now assumed that such square waveforms as shown in FIG. 11(a) are continuously inputted into the system. If the time constant in the response of the system is larger than the input cycle of square waveforms, the outputs in the system response will be sequentially overlaid one with another, as shown in FIG. 11(a). This does not provide any proper recognition result.

On the other hand, the time constant in the system having such an autoregressive loop as shown in FIG. 8 can be optimized by learning. Therefore, the response of this system can be modified as shown in FIG. 11(b), which provides an improved recognition result.

By combining the learning function of such a system for time constant with an appropriate learning method, the noise resistance and the like in the systems of FIGS. 6 and 7 can be further improved.

Figure 9:
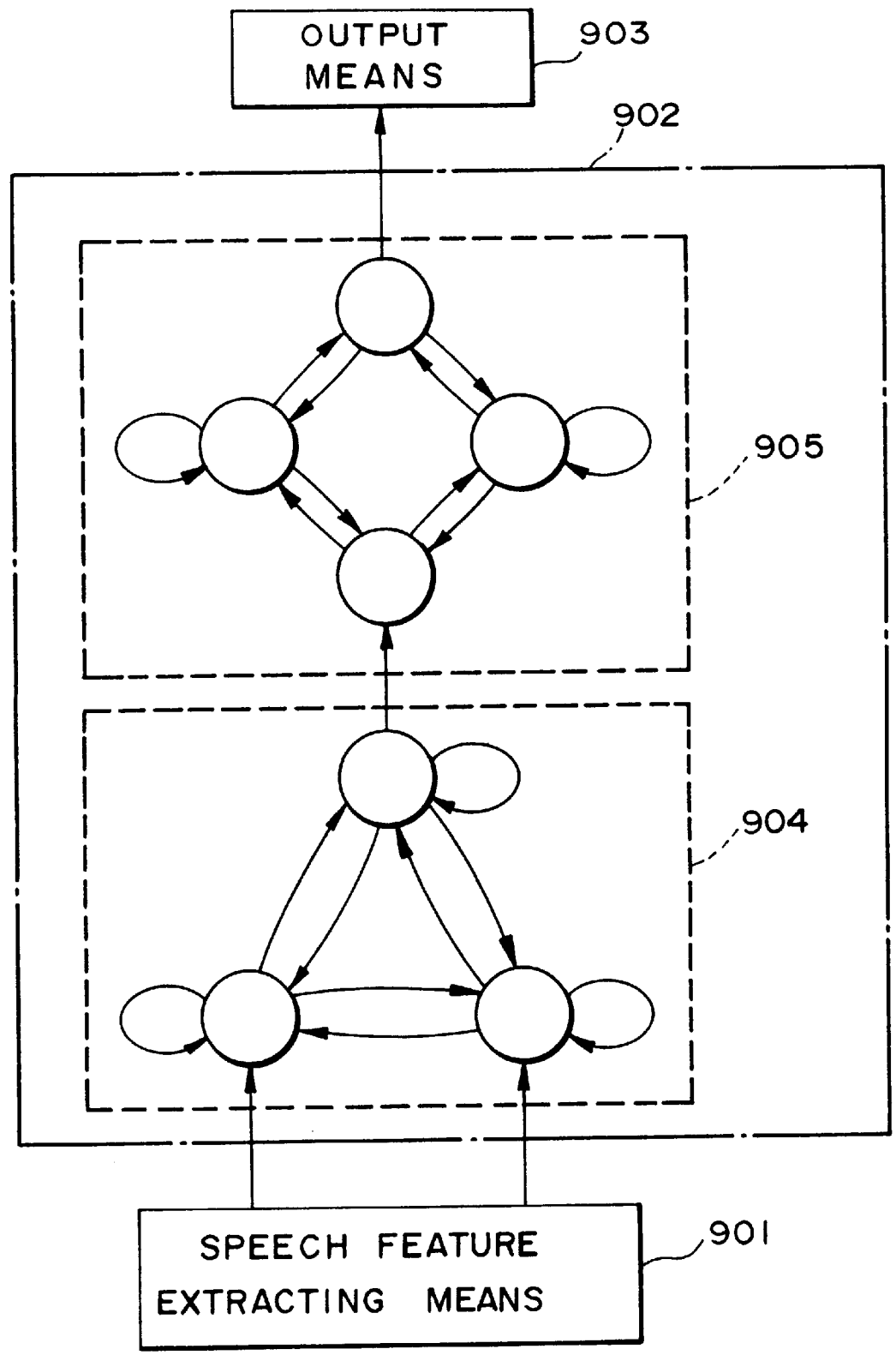
FIG. 9 is a view of a random connecting type neural network.

The last arrangement of a neural network obtained by modifying the neural network of FIG. 8 into a random connecting type neural network is shown in FIG. 9. The random connecting type neural network 902 comprises two sub-networks: an input network 904, and an output network 905. In this embodiment, the input network is an entire connecting type sub-network while the output network is a random connecting type sub-network. These sub-networks are connected with each other only in one direction.

Such an arrangement provides the following advantages in addition to the aforementioned advantages. By using the association ability of the entire connecting type neural network, functions such as the supplementation of input defects or the improvement of noise resistance can be achieved. Further, the one-direction connection can heuristically treat the flow of information to optimize various functions such as information compression, and information expansion.

Although various modifications of the neural network shown in FIG. 4 have been described, another arrangement of the speech recognition apparatus itself will be described now.

Figure 12:
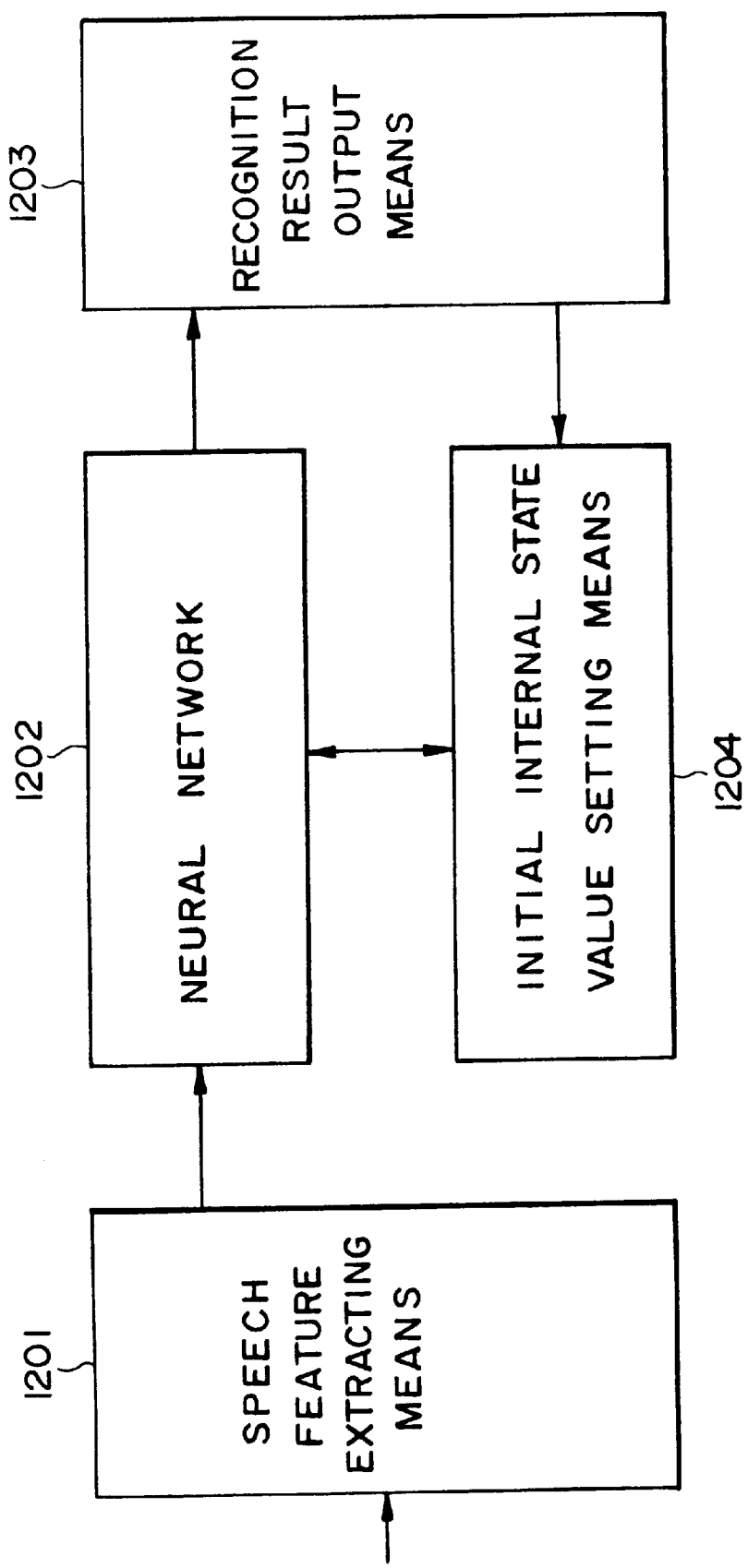
FIG. 12 is a view of another recognition apparatus using the neuron elements of the present invention.

FIG. 12 shows the same arrangement as that of FIG. 4 except that the speech recognition apparatus additionally comprises initial internal state value setting means 1204. As shown by the formula (2), the operation of the neural network according to the present invention can be described by the first order differential equation. Thus, in order to determine the operation, an initial value is required. The initial internal state value setting means provides present initial values to all the nodes prior to actuation of the neural network. The operational procedure of the speech recognition apparatus will be described with reference to FIG. 13.

1. The initial internal state value setting means sets a suitably selected initial internal state value X at all the nodes and sets an output Y corresponding to it.

2. The procedure finishes if the process goes to the end step.
3. The sum of input values Z is determined in all the nodes. The input values Z were described. Speech feature value extracted by the speech feature extracting means constitutes a part of input values Z as an external input value.
4. For each of the nodes, the internal state value X is updated on the basis of the sum of input values Z, that have been determined in step 3 and on the basis of the internal state value X itself.
5. The output value Y is calculated from the updated value X.
6. The procedure returns to the step 2.

The recognition result is provided to the recognition result output means as an output from a node assigned for it.

The basic operational and structural concepts of the speech recognition apparatus having the neural network which uses the nodes constructed according to the present invention have been described above. In order to cause such a neural network to perform the desired processing, the neural network should be caused to learn. A method of causing the neural network to learn will be described below.

Figure 14:
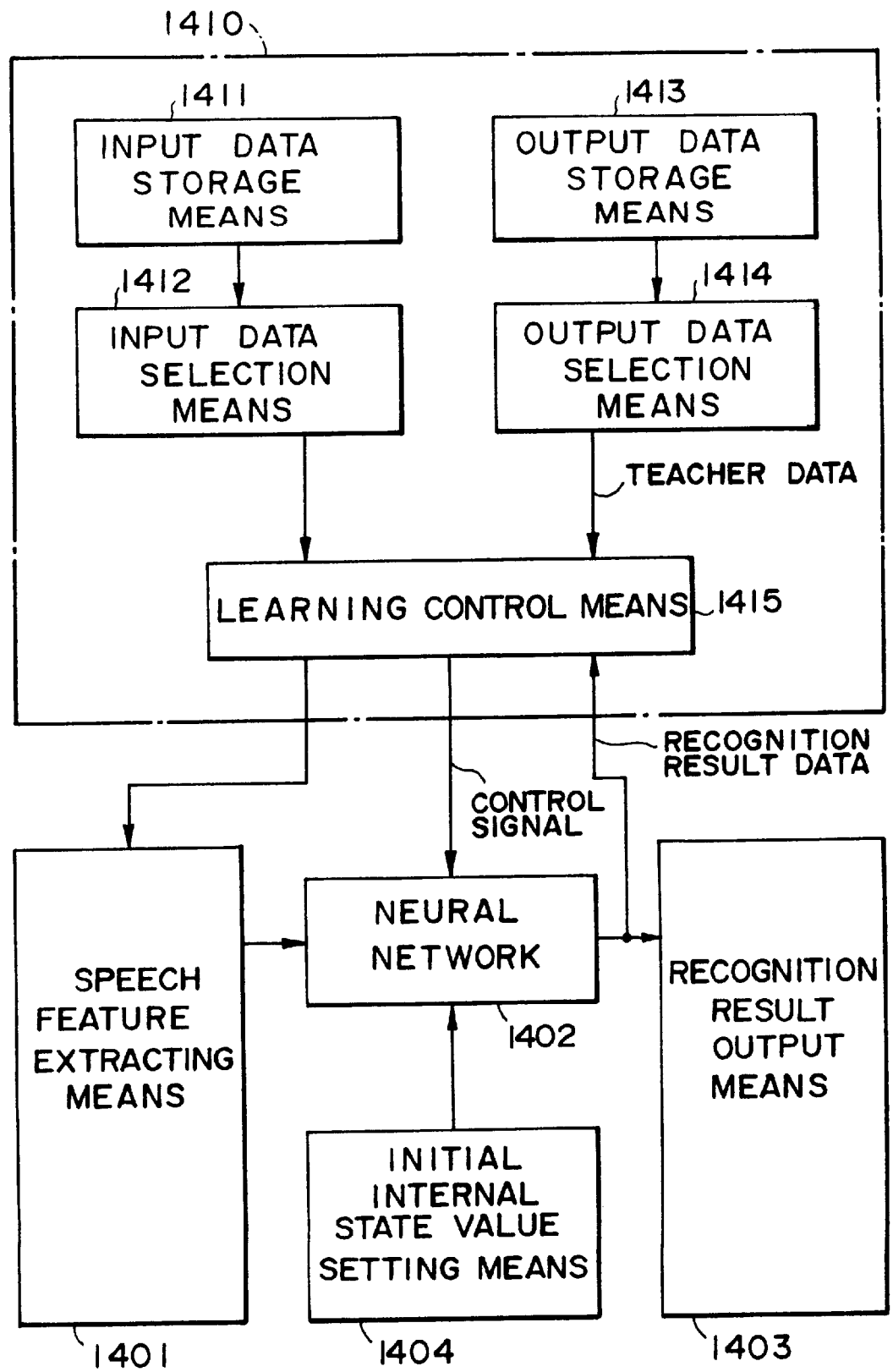
FIG. 14 is a view illustrating a method of the present invention for causing the recognition apparatus using the neural network of the present invention to learn.

FIG. 14 is a block diagram illustrating a learning process for the speech recognition apparatus of the present invention. In FIG. 14, numeral 1410 designates a learning section for causing a neural network 1402 to learn, 1411 designates input data storage means for storing given input learning data, 1413 designates output data storage means for storing output data which are models corresponding to each input learning data, 1412 designates input data selection means for selecting input data to be learned from the input data storage means, 1414 designates output data selection means for selecting output data in the same manner, and 1415 designates a learning control means for controlling the learning of the neural network.

Figure 13:
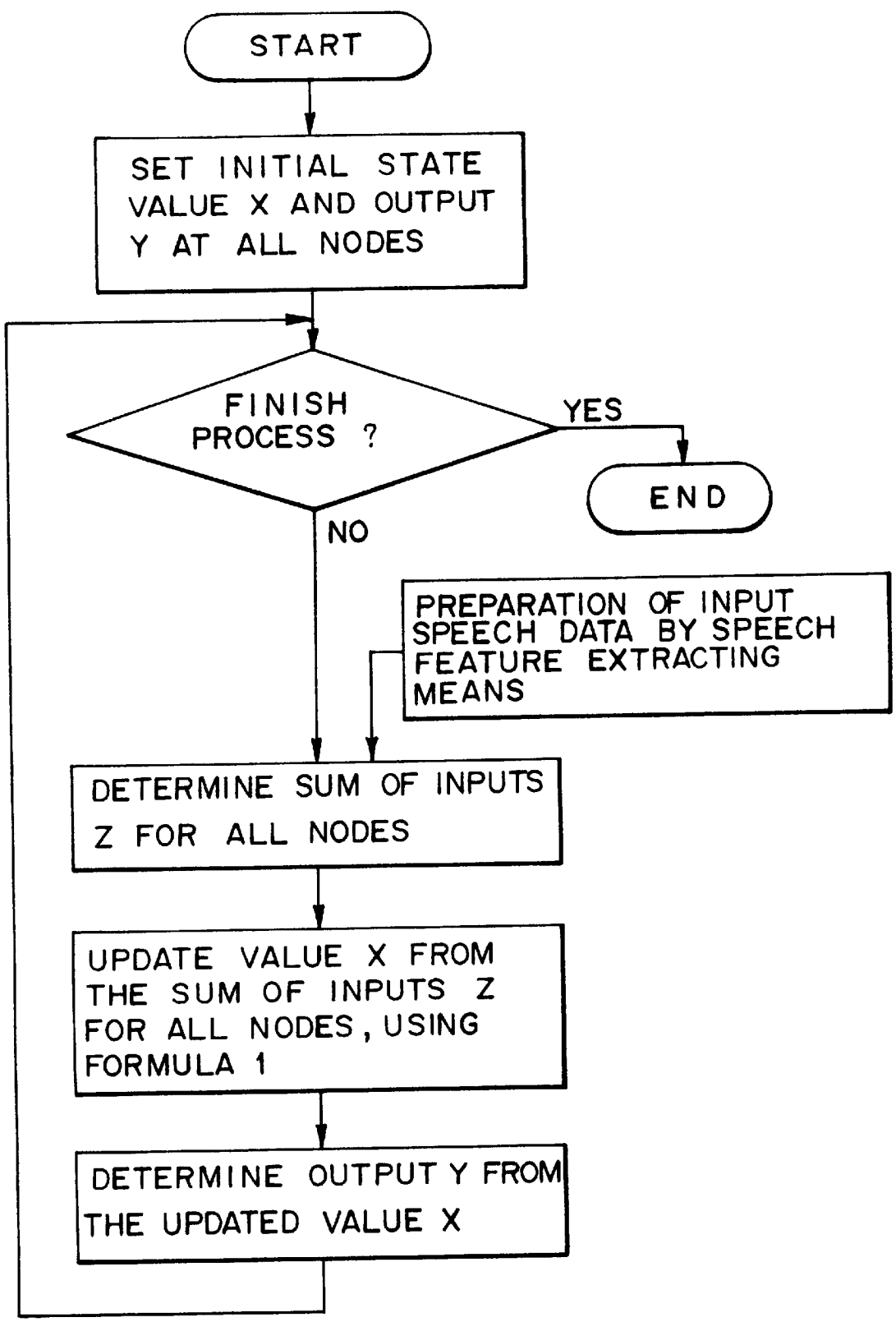
FIG. 13 is a view illustrating the operational procedure of the recognition apparatus shown in FIG. 12.

The manner in which the speech recognition apparatus is caused to learn by the learning section will be described with reference to FIGS. 13 and 14. First of all, preset initial state values X are set at all the nodes. Secondly, input learning data to be learned is selected by the input data selection means. The selected input data is fed to the learning control means. At this time, output learning data corresponding to the selected input learning data is selected by the output data selection means. The selected output data is similarly fed to the learning control means. The selected input learning data is received by the speech feature extracting means 1401, in which feature vector is extracted to be inputted to the neural network as an external input. For each of the nodes, the sum of inputs Z is determined and the internal state value X is updated according to the formula (2). Thus, an output Y is determined from the updated internal state value X.

In the initial step, the connecting weight of units with each other in the neural network is random. Thus, the output value Y from the neural network also is random.

Figure 15:
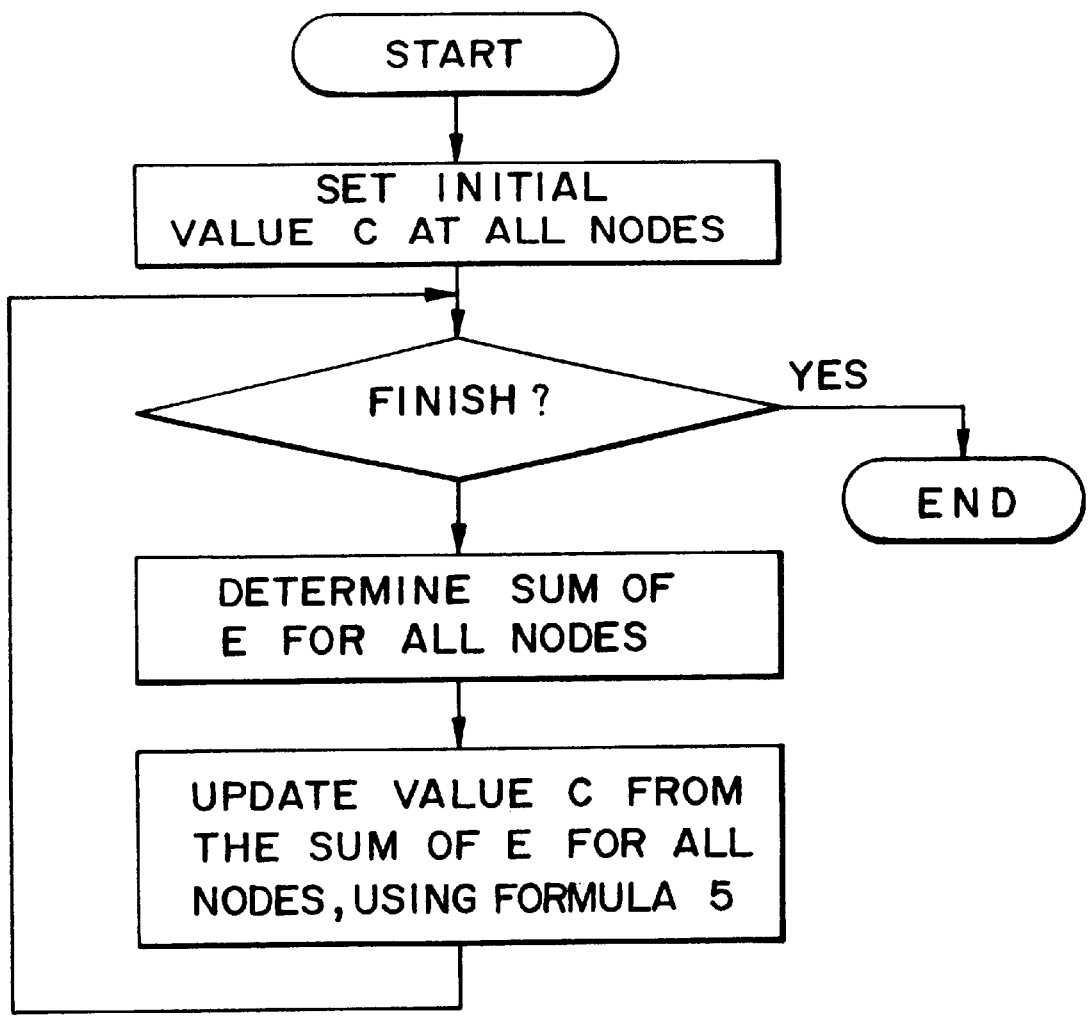
FIG. 15 is a view illustrating the operational procedure in the learning method of the present invention.

The above procedure will be repeated to the end of the input data time series. For the resulting time series of output Y, a learning evaluation value C is determined by the following formula:

$$\tau_i \frac{d}{dt} C_i = -C_i + \sum_j E_j \qquad (7)$$

where E is an error evaluation value. The time series of the learning evaluation value C are calculated along such a procedure as shown in FIG. 15 following the formula (7).

As an practical example of this procedure, the error evaluation value E can be written, using Kullback-Leibler distance as an error evaluation function, as follows:

$$E(Y_i, T_i) = T_i \log (T_i/Y_i) + (1-T_i) \log [(1-T_i)/(1-Y_i)] \qquad (8)$$

where T is the output learning data corresponding to the selected input learning data; and Y is an output value corresponding to the input learning data. By using Kullback-Leibler distance, the learning speed can be increased due to various factors.

Where the output value generating means has symmetrical outputs, the formula (8) can be replaced by the following formula (9), which is substantially the same as the formula (8):

$$E(Y_i, T_i) = [(1+T_i)/2] \log [(1+T_i)/(1+Y_i)] + [(1-T_i)/2)] \log [(1-T_i)/(1-Y_i)] \qquad (9)$$

By using these formulae, the formula (7) can more concretely be rewritten as formula (10):

$$\tau_i \frac{d}{dt} C_i = C_i - \sum_j W_{ji} C_j (1 - Y_j^2) + (Y_i - T_i) \qquad (10)$$

Thus, the modification rule of the connecting weight W is provided by:

$$\Delta W_{ij} = -\alpha \int C_i Y_j dt \qquad (11)$$

where $\alpha$ is a small and positive constant. The connecting weight of units with each other can thus be changed to provide the desired output. By repeatedly inputting speech data to be recognized, and by changing the connecting weight of units with each other little by little, a correct value will come to be outputted from the network. The number of repetitions necessary for the output to converge is in the order of several thousands.

Such a learning rule may apparently be applied not only to the entire connecting type neural network exemplified, but also to any random connecting type neural network which includes specific examples such as layered connection and the like and which can be used more generally in the art.

Another method of causing the speech recognition apparatus to learn by continuously inputting two input data for learning will be described using the neural network with two outputs, positive and negative outputs, for example.

Figure 16A:
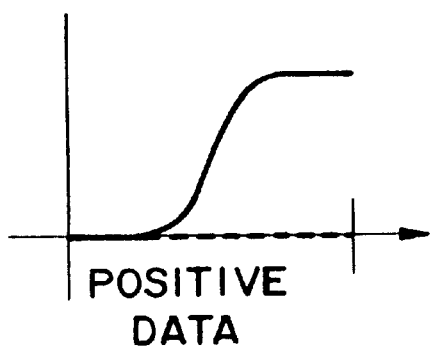
FIGS. 16a and 16b are a view showing the connecting of learning data in the present invention.
Figure 16B:
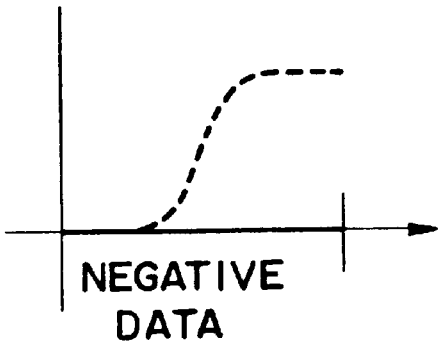
Figure 17A:
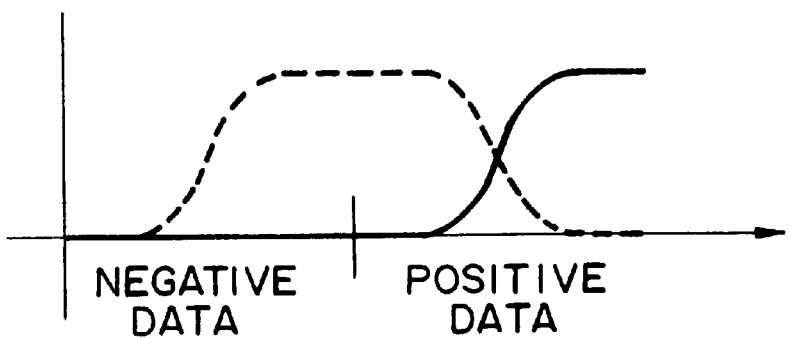
FIGS. 17a, 17b, 17c and 17d are a view showing a form of learning data in the present invention.
Figure 17B:
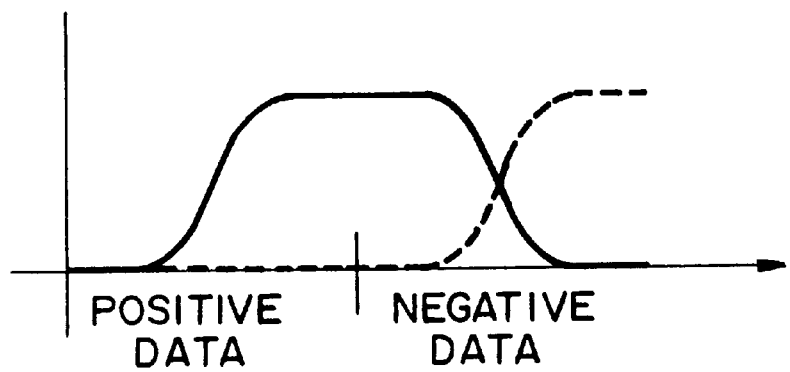
Figure 17C:
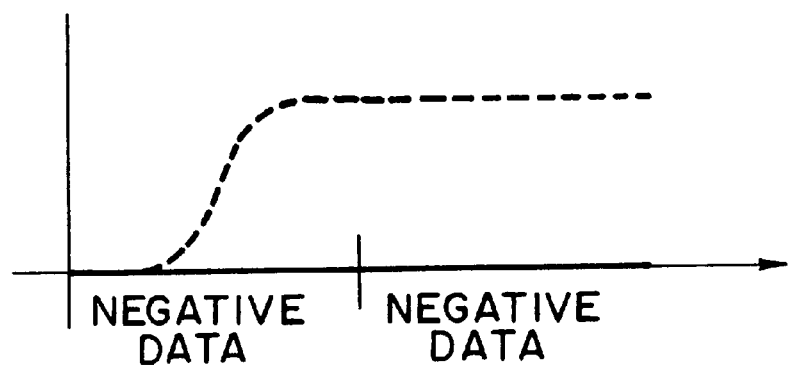
Figure 17D:
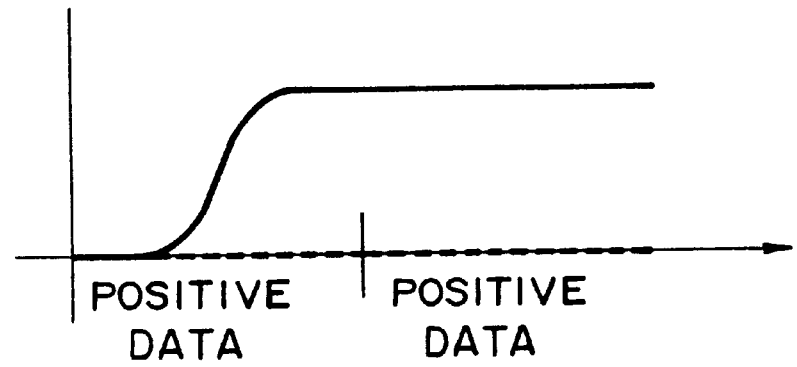

In the learning method using the input data one by one, the positive output cannot be lowered to low level once it has been shifted to high level. Conversely, the negative output cannot be raised to high level once it has been shifted to low level. More particularly, such a learning method input data one by one performs a learning in which when input data to be recognized (hereinafter called "positive data") is provided, the positive output is raised to high level while the negative output remains low level, as shown in FIG. 16(a), or performs another learning in which when input data not to be recognized (hereinafter called "negative data") is provided, the negative output is raised to a high level while the positive output remains at a low level, as shown in FIG. 16(b). However, through these learnings, the positive or negative output once raised to high level will not be lowered.

If a plurality of speech data containing both positive and negative data are continuously inputted to the system and when the positive output has been raised to high level by the positive data, the positive output will not be lowered to low level even if the negative data is inputted to the system. This applies to negative output as well.

Therefore, the present embodiment uses a learning method for both raising and lowering the output by continuously providing two speech data, as shown in FIGS. 17(*a*)–(*d*). In FIG. 17(*a*), negative and positive data are continuously inputted in this order to cause the neural network to learn the raising of the positive output and the raising and lowering of the negative output. In FIG. 17(*b*), positive and negative data are continuously inputted in this order to cause the neural network to learn the raising and lowering of the positive output and the raising of the negative output. In FIG. 17(*c*), two negative data are continuously inputted such that the neural network will not have a wrong recognition, through the learning of FIG. 17(*a*), that a positive data always follows a negative data. In FIG. 17(*d*), similarly, two positive data are continuously inputted such that the neural network will not have a wrong recognition, through the learning of FIG. 17(*b*), that a negative data always follows a positive data.

In other words, this is a problem of the initial value dependency in the operation of the neural network. The learning process using only a single input data is started only from a specific initial value. Thus, the learning process is effective to show an expected ability only for the initial value. For general use of the neural network, it must be caused to learn to provide correct responses for a variety of initial values. All the possible events may not need to be considered as initial values. In actual recognitions, the number of possible initial value combinations for an object to be recognized is limited due to various restrictions. The use of a chain of two or more data in the learning process approximately provides such possible combinations of initial values. For such a purpose, only continuous data consisting of two single data can provide a satisfactory result. It is acceptable, of course, to use continuous data consisting of three or more single data.

Figure 18:
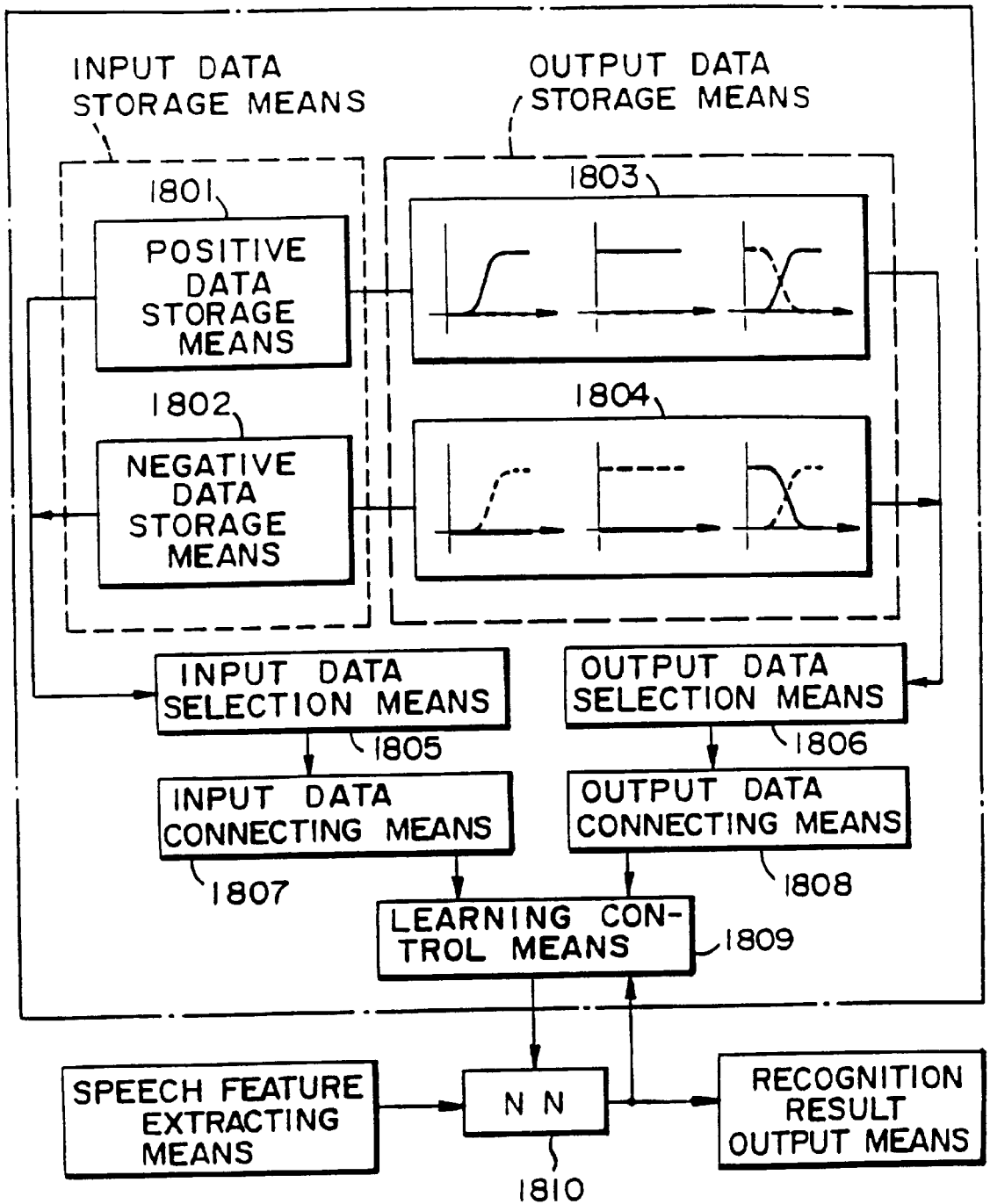
FIG. 18 is a view showing another learning method of the present invention for the recognition apparatus using the neural network of the present invention.

FIG. 18 shows a speech recognition apparatus which can cause the neural network to learn continuous input data consisting of two single data. The input data storage means described in connection with FIG. 14 comprises means for storing data of two categories: positive and negative data. In FIG. 18, 1801 designates positive data storage means for storing positive data which is a group of words to be recognized collected under various conditions, 1802 designates negative data storage means for storing negative data which is a group of words other than the words to be recognized, and 1803 and 1804 designate output data storage means for storing output learning data belonging to the respective categories. It is assumed herein that each of the categories includes three data. Reference numeral 1805 designates input data selection means, 1806 designates output data selection means, 1807 designates input data connecting means, 1808 designates output data connecting means, 1809 designates learning control means, and 1810 designates a neural network, respectively.

The input data selection means selects two input learning data from the positive data storage means 1801 and negative data storage means 1802. Combinations of these data are as shown in FIGS. 17*a*–17*d*. The two selected input data are combined into a single continuous data by the input data connecting means. Then, the continuous data is feature-extracted by the speech feature extracting means and then inputted into the neural network. The neural network then calculates the output value in time series according to the procedure of FIG. 13. The output of the neural network is fed to the learning control means where it is compared with a preselected output learning data to calculate an error, by which the connecting weight at each node will be modified.

In such a manner, the neural network will repeatedly be caused to learn. In FIG. 18, the output of the neural network includes two nodes: positive and negative output nodes. Solid lines in the output data storage means 1803 and 1804 represent the learning output of the positive output node corresponding to the positive data, while broken lines represent the learning output of the negative output node corresponding to the negative data.

The recognition results of the speech recognition apparatus which comprises the neural network made of nodes having such features and which has been caused to learn according to the learning method described with reference to FIG. 18 are shown below. Assuming the twentieth order of LPC cepstrum as the output of the speech feature extracting means, the neural network was actually constructed to include 32 nodes in total: 20 input nodes, 2 output nodes and 10 other nodes.

The learning will first be described. The learning was carried out under such a condition that a word to be recognized (positive data) was "TORIAEZU" (FIRST OF ALL) and the other eight reference words (negative data) were "SHUUTEN" (TERMINAL), "UDEMAE" (SKILL), "KYOZETSU" (REJECTION), "CHOUETSU" (TRANSCENDENCE), "BUNRUI" (CLASSIFICATION), "ROKKAA" (LOCKER), "SANMYAKU" (MOUNTAIN RANGE) and "KAKURE PYURITAN" (HIDDEN PURITAN). The neural network was assumed to have two outputs, that is, a positive output corresponding to the positive data and a negative output corresponding to the negative data. Four different categories of learning outputs were supposed as described in connection with FIGS. 17(*a*)–17(*d*). The sigmoid function of the formula (5), having an origin at the temporal middle point of the curved part of each of these learning output data of which start edge corresponds to −10 and of which end edge corresponds to 10, and was modified to be within a range of 0 and 0.9, or the reversed was used for the curved part of each of the learning output data. Speakers to be learned were MAU and FSU in Japanese speech data base prepared by ATR Interpreting Telephony Research Laboratories, Inc.

The correspondence between the input and output was set such that when input data for one frame (in this case, the twentieth order of LPC cepstrum) was inputted, a set of positive and negative outputs was obtained. It is therefore not required to input data for a plurality of frames as in the prior art.

A "BP model with feedback connections" type neural network which is a modification of the prior art MLP method raised a problem in that it is difficult to converge the learning and also in that the learning outputs must be prepared in the trial-and-error manner. Whereas, the neural network of the present invention can generate the desired outputs by causing it to learn several hundreds to several thousands times according to the speech learning method of the present invention. The learning outputs can readily be determined as an only possible output without a trial-and-error aspect at all.

FIG. 25 shows test results when data containing unknown words not used in the learning are given to the neural network after the above learning has been carried out. Words of 216 kinds were available, in which 9 kinds were used for learning. Tests were carried out using two-word chain data which were prepared by combining the 216 kinds of words into a variety of combinations. In the tests, the total number of appearing words was equal to 1290 for one speaker. The recognition result judgments were based on the combinations of positive output and negative output. If the positive output is equal to or more than 0.75 and the negative output is equal to or less than 0.25, it is judged that the detection is made. If the positive output is equal to or less than 0.25 and the negative output is equal to or more than 0.75, it is judged that the detection is not made. In the other case, it is judged that the system is in confused state. Under such conditions of judgment, it is considered that there is an insertion error if any output is detected in a position having no word to be detected, and that there is an omission error if any output is not detected in a position having a word to be detected.

FIG. 26 shows results in the same tests as in FIG. 25 that were carried out for nine unknown speakers other than the speakers used for the learning.

As is apparent from FIGS. 25 and 26, the speech recognizing method of the present invention can provide a very improved rate of recognition even if small number of data are learned by the speech recognition apparatus.

Figure 19:
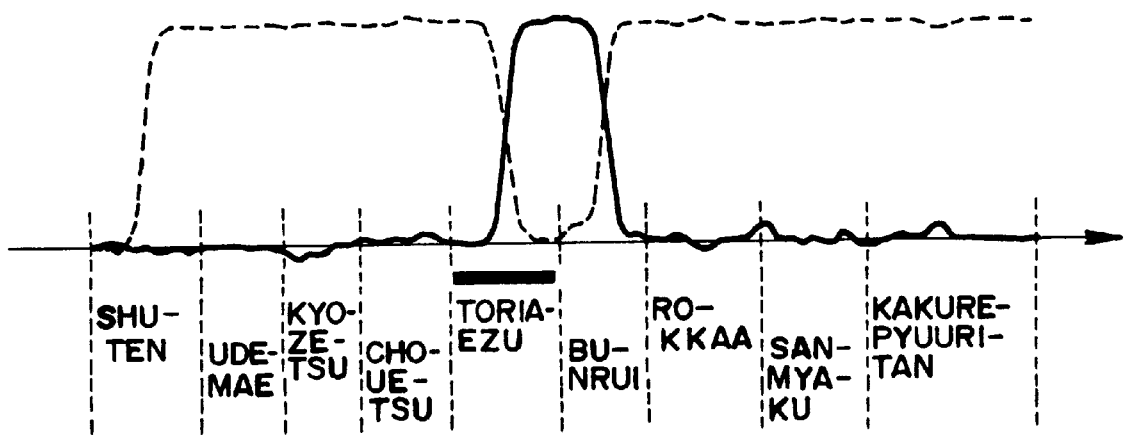
FIG. 19 is a view showing the speech word detection output of the recognition apparatus of the present invention.

FIG. 19 shows the detection of words to be recognized from three or more successive words. In FIG. 19, a solid line shows positive outputs, while a broken line shows negative outputs. As is apparent from FIG. 19, the speech recognition apparatus recognizes the word "TORIAEZU" (FIRST OF ALL) without being supplied with start and end edges as in the prior art.

Figure 20:
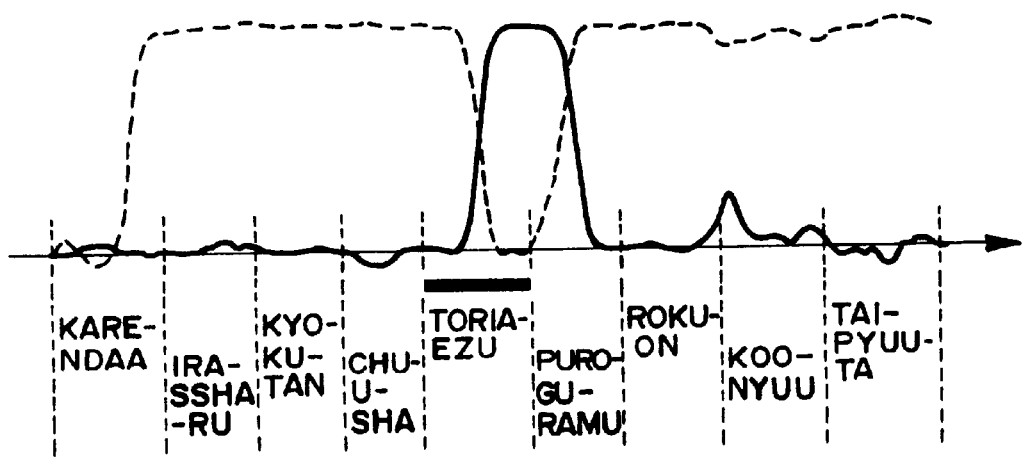
FIG. 20 is a view showing another speech word detection output of the speech recognition apparatus of the present invention.

FIG. 20 shows the recognition of the word to be recognized, "TORIAEZU", among the unknown words. As in FIG. 19, a solid line shows positive outputs while a broken line shows negative outputs. It is thus found that the recognition method of the present invention has a sufficient generalizing ability.

Since the length of data given in FIG. 19 is equal to 1049 in total, the prior art, which should perform the recognition with the start and end edges of the data, is required to check combinations in the order of square of 1049. However, the present invention requires to input each of 1049 data once. Thus, the process can be carried out within one several hundredth of a time required by conventional processes. Furthermore, since each data needs to be inputted only once, the present invention does not require the storage of data within the ranges of possible start and end edges as in the prior art. As a result, both the amount of data memory and the amount of calculation can be reduced.

Since the output has a peak at a necessary place, rather than monotonous increase or decrease as in the DP and HMM methods of the prior art, the output value is not required to be normalized for the length of the input data. More particularly, the outputs are always within a range (in this case, between –1 and 1) and also the weight of an output is invariable within a recognition section. This means that dynamic range of a value to be processed is narrower, and that the speech recognition apparatus can achieve sufficient performance using integer data rather than using floating-point data or logarithmic data on processing.

Because two outputs, positive and negative, are used collectively to make the recognition, the recognition does not fail since the negative output is not lowered even if the positive output begins to raise at a word "KOUNYU" (PURCHASE) in FIG. 20. Thus, the speech recognition can be improved in accuracy. It is of course that the number of outputs is not limited to 2, but can be increased if necessary. For example, if an output is added which represents degree of resemblance between the presently inputted data and the data used in the learning, the result of recognition can be improved in accuracy. If a plurality of such outputs are used, the neural network which provides optimum results can be chosen.

In addition, the present invention can recognize syllables or phonemes, rather than words as exemplified. In such a case, a relatively small number of neural networks need to be used to recognize the entire language speech. This enables a dictation system to be constructed, for example. The unit of recognition can be abstract ones which are not related to languages. This is particularly effective when the speech recognition apparatus is used to compress information.

Figure 21:
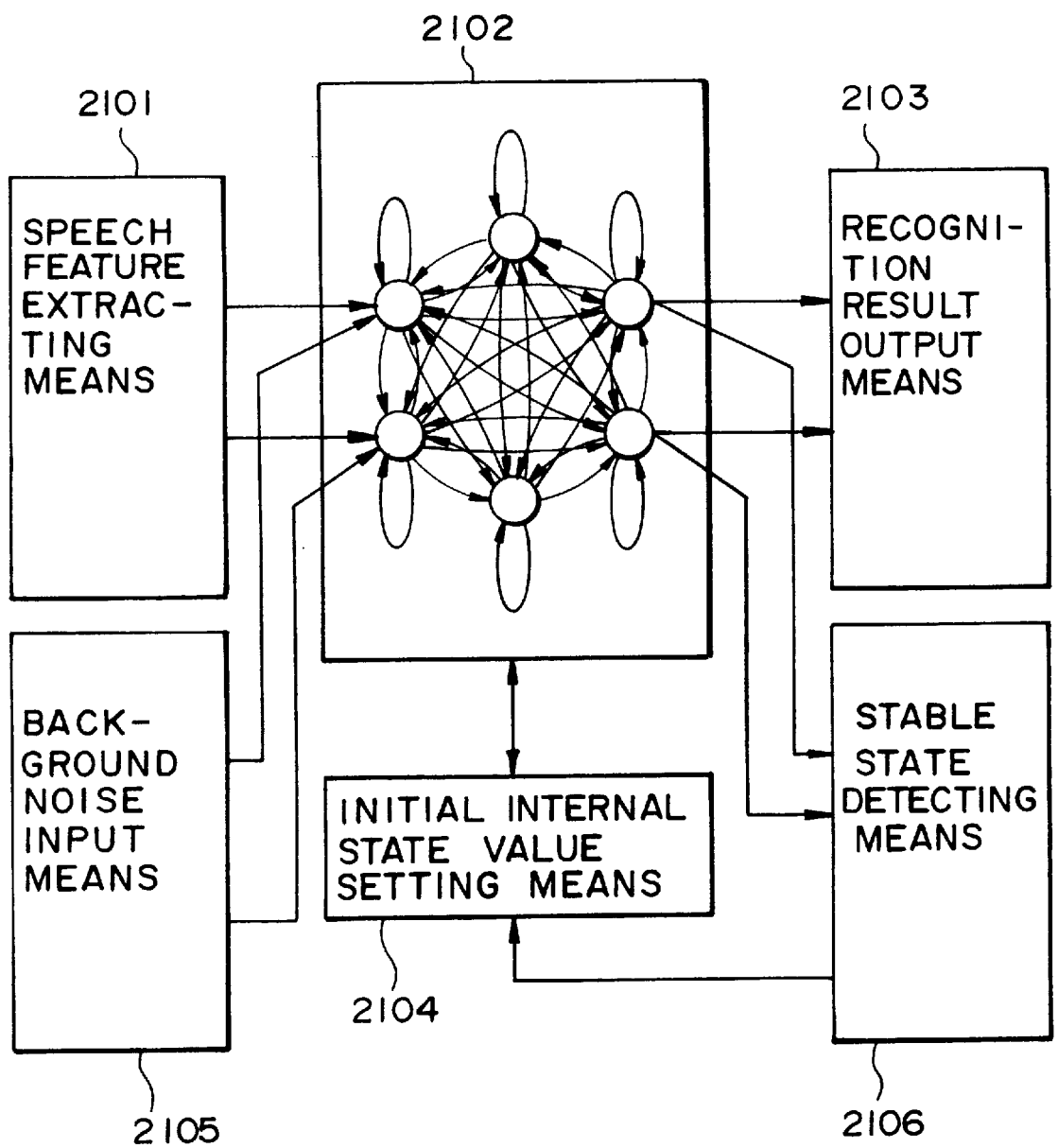
FIG. 21 is a view showing another arrangement of a recognition apparatus constructed in accordance with the present invention.

FIG. 21 shows another embodiment of the present invention which is different from the speech recognition apparatus of FIG. 12 in that background noise input means 2105 and stable state detection means 2106 are added to it. The other parts are similar to those of means FIG. 12.

Figure 22:
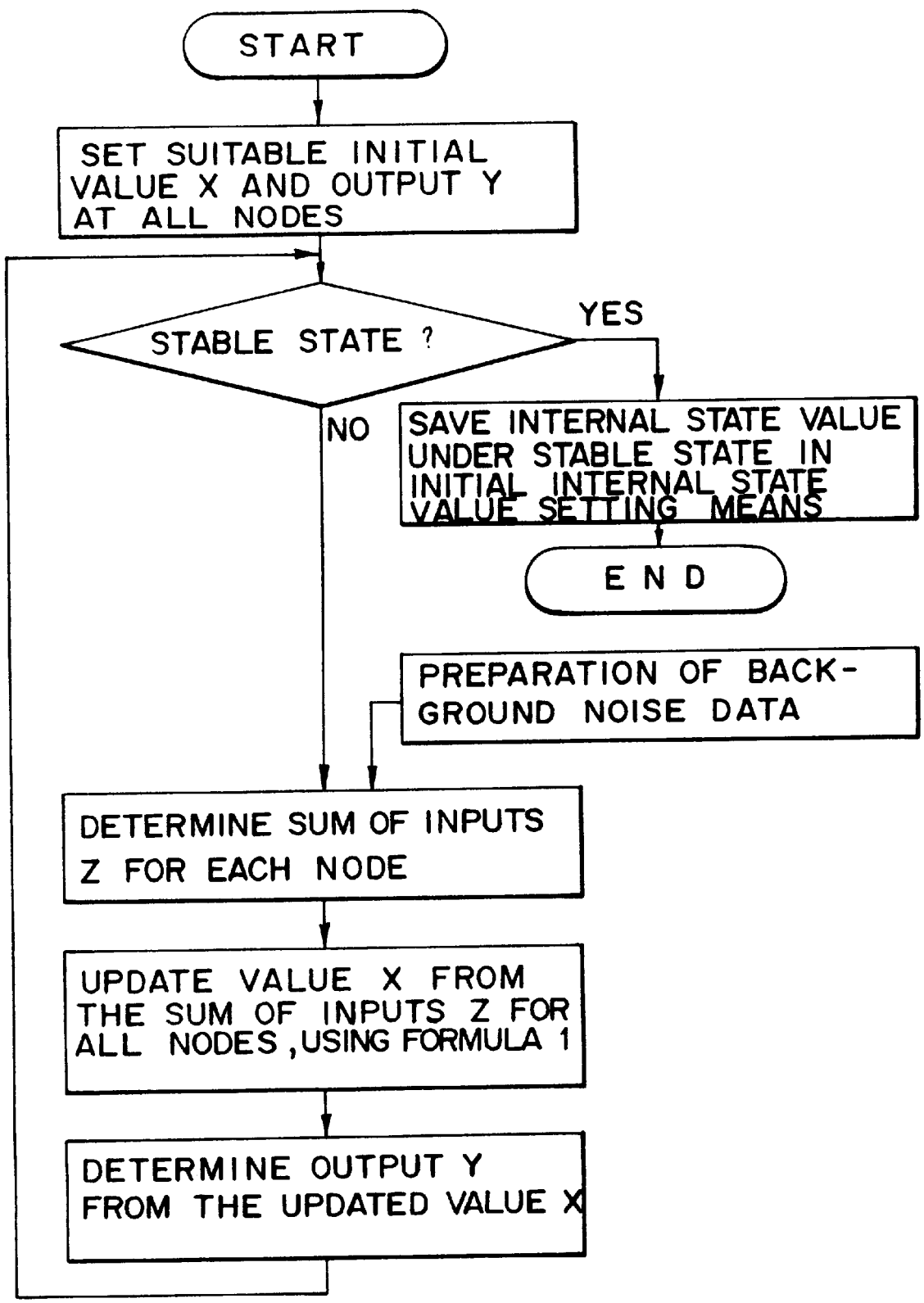
FIG. 22 is a view illustrating the operational procedure of the recognition apparatus shown in FIG. 21.

FIG. 22 shows a flowchart of the process through which the initial internal state value is determined in the arrangement of FIG. 21. In this flowchart, a step of preparing background noise data may comprise suitable initial value setting means, and suitable constant input preparing means. Or the step can be omitted to correspond to no input. FIG. 27 shows results of recognition obtained by causing the speech recognition apparatus to learn according to the learning method of FIG. 18, which corresponds to tables 1 and 2 of the first embodiment combined. The results are obtained by saving, as initial values, the internal state values of the neural network which became stable when background noise are inputted for about 3 seconds. On recognition, these values are used as initial values in the differential equation (2).

As is apparent from FIG. 27, the present embodiment reduces omission errors in comparison with the results of the first embodiment.

The actual speech recognition systems of higher performance often use a language processing function in addition to a simple speech recognizing function. In such a case, the insertion error can relatively easily be corrected or canceled considering language restrictions, but the omission error is difficult to be inferred and added considering the same language restrictions. Therefore, the improvement in the rate of omission error by the present embodiment is important in realizing a speech recognition apparatus of higher performance.

Figure 23:
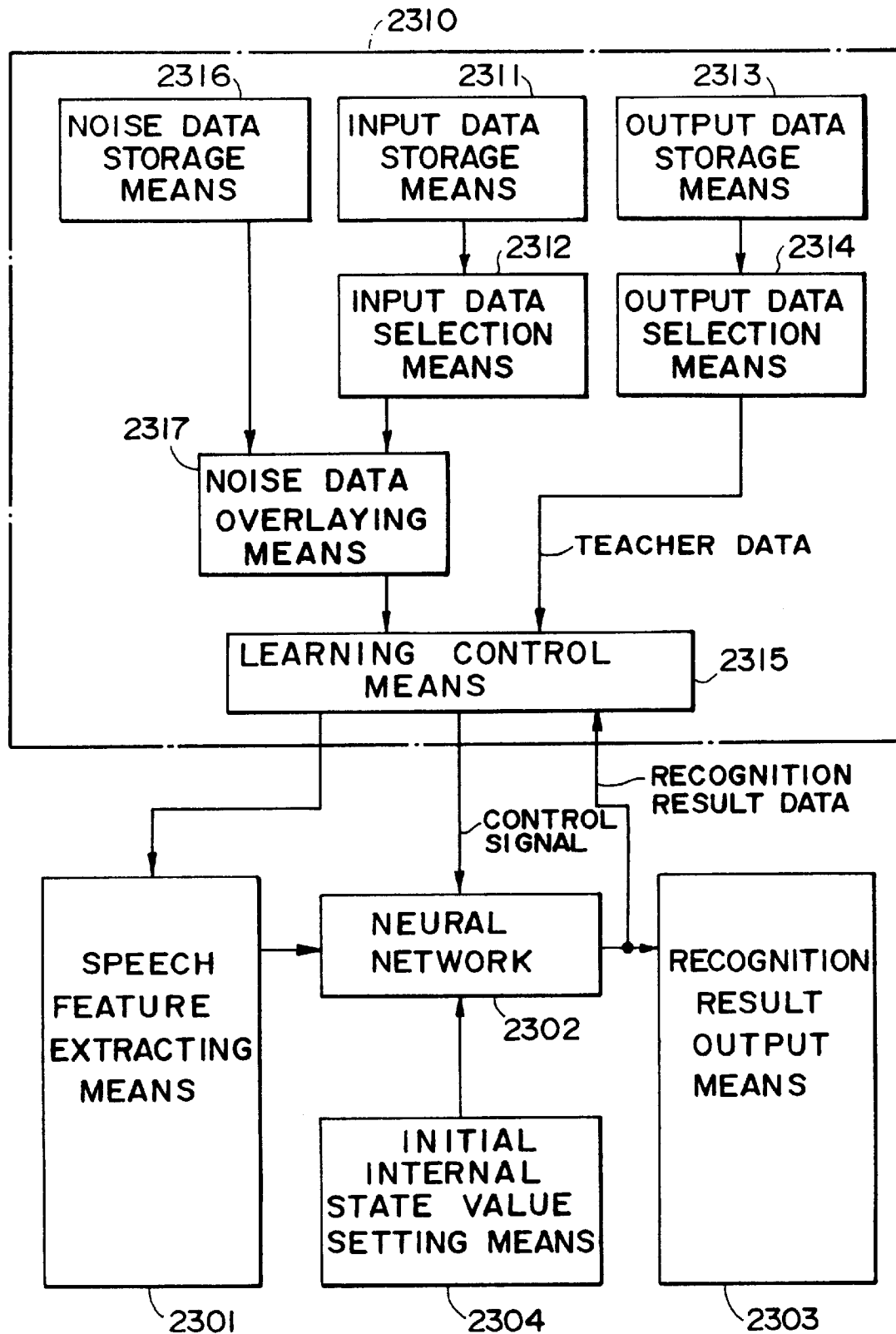
FIG. 23 is a view illustrating a method of causing a recognition apparatus having background noise overlaying means to learn.

FIG. 23 shows still another embodiment that the learning section of FIG. 14 further comprises noise data storage means and noise data overlaying means. The basic learning method is as described in connection with FIG. 14. This embodiment is characterized by that the learning data is a data overlaid with noise components beforehand. To recognize the learning data after the noise components have been removed, the connection weightings of units in the neural network is adjusted by the learning control means. In other words, the neural network is caused to learn so that the noise components contained in the learning data can definitely be differentiated.

Figure 24A:
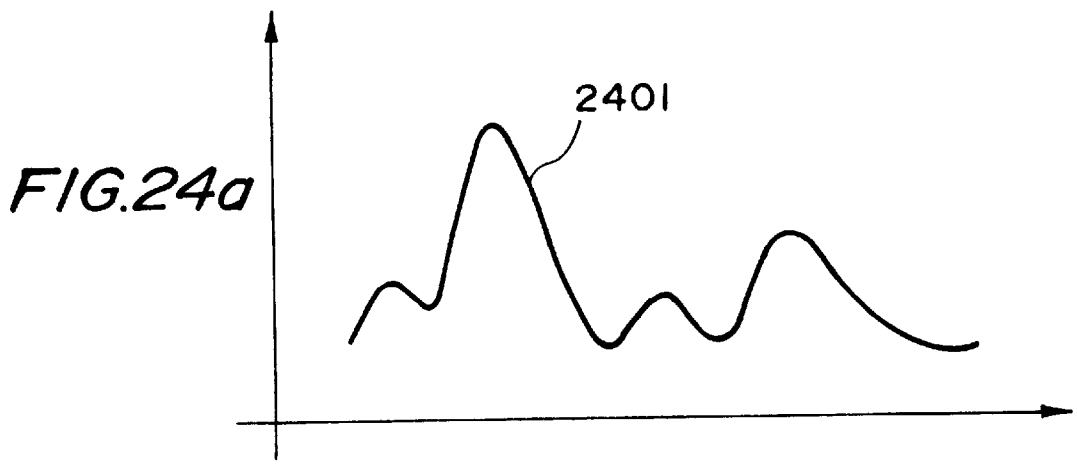
FIGS. 24a, 24b and 24c are a view illustrating a method of overlaying learning data with noise components.
Figure 24B:
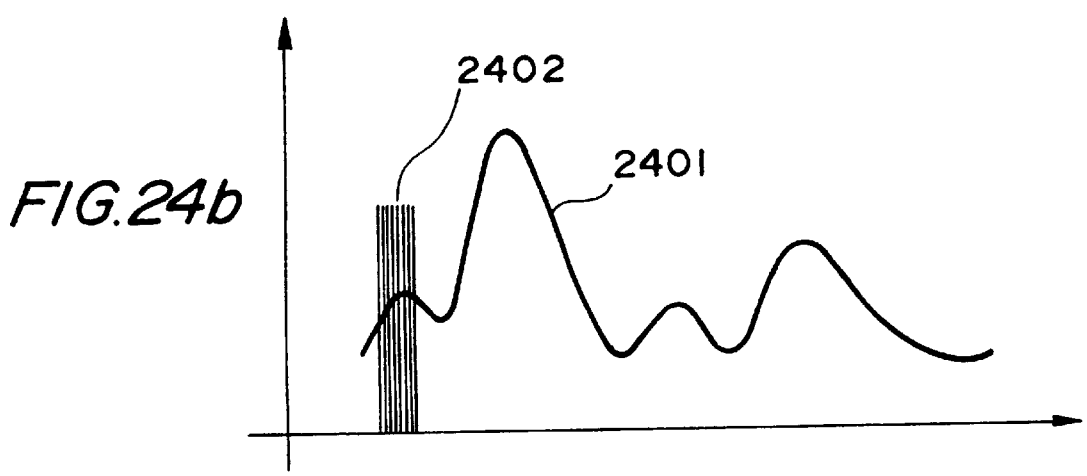
Figure 24C:
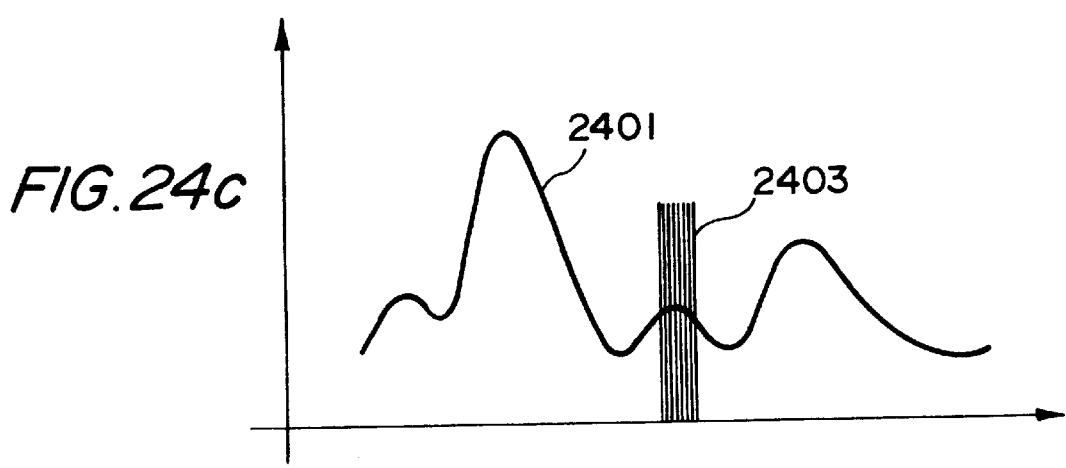

The overlaying of the learning data with the noise components is carried out at a plurality of locations, as shown in FIGS. 24(a)–24(c). In this figure, reference numeral 2401 designates the learning data, and reference numerals 2402 and 2403 designate the noise components. FIG. 24(b) shows an example of the learning data of FIG. 24(a) overlaid with the noise component 2402 at its forward portion, while FIG. 24(c) shows an example of the learning data overlaid with the noise component 2403 at its rearward portion. When such overlaid data obtained by overlaying the learning data with the noise components are used, the neural network can definitely differentiate only the noise components by causing the neural network to learn the learning data overlaid with noise components removing the noise components.

Consequently, the neural network can property recognize nonconstant noises with which the speech data is overlaid.

The present invention provides the speech recognition apparatus and its learning method which are very effective not only in the continuous speech recognition but also in the discrete speech recognition.

Further, the present invention is effective not only in the speech recognition but also in any processing of time series information if the correspondence between input data and output data can be taken. The present invention is considered to be applicable to compression of information, expansion of information, waveform equivalence and the like.

The previous embodiments of the present invention are described as they apply to speech recognition. Nevertheless, the present invention may be applied to recognizing input signals. For instance, the method described in the previous embodiments may be used for recognizing characters, figures, handwriting input via an on-line system, signs, pupils (of an individual), stock prices, an object to be detected on a radar (e.g., the type of an aircraft with reflected eaves of a radar) and an object to be detected by a sound navigation and ranging (SONAR) (e.g., a whale).

What is claimed is:

1. A recognition apparatus comprising:

feature extracting means for extracting values of an input to be recognized and for inputting extracted values into a recurrent neural network, and a learning section for causing said recurrent neural network to learn, the learning section comprising:

input data storage means for storing input learning data of a plurality of continuous data streams within a plurality of categories;

input data selection means for selecting input learning data of a plurality of continuous data streams to be learned within a plurality of categories from said input data storage means;

output data storage means comprising a positive output data storage means and a negative output data storage means for storing output learning data of a plurality of continuous data streams within a plurality of categories each of which corresponds to an input learning data category;

output data selection means for selecting output learning data of a plurality of continuous data streams to be learned, each of which corresponds to an input learning data category selected by said input data selection means from said output data storage means;

input data connecting means for connecting the input learning data selected by said input data selection means into a single continuous data stream;

output data connecting means for connecting the output learning data selected by said output data selection means into a single continuous data stream in correlation with the connection of said input learning data; and learning control means for inputting said connected input learning data stream into said feature extracting means and for changing weightings at connections of neuron elements on the basis of outputs of said recurrent neural network and said connected output learning data stream.

2. The recognition apparatus as in claim 1, the recurrent neural network comprising layered and partially recurrent components comprising output limiting type, dynamic neuron elements, each of the neuron elements comprising:

internal state value storage means, for storing a current internal state value, said storage means comprising an integrator for integrating accumulated values;

internal state value updating means for inputting accumulated values into said internal state value storage means comprising a weighted accumulator for performing weighted accumulations of input values to said dynamic neuron element and the current internal state value; and an output value limiter for converting said internal state value into an external output value between an upper preset limit and a lower preset limit, said integrator and accumulator forming a feedback loop in said dynamic neuron element.

3. The recognition apparatus as in claim 1, wherein the number of said categories is equal to 2.

4. The recognition apparatus as in claim 1, wherein said learning section further comprises:

noise data storage means for storing noise data;

noise overlaying means for overlaying said selected input learning data with the noise data from noise data storage means, the selected input learning data overlaid with the noise data by said noise overlaying means causing said recurrent neural network to learn; and means for shifting said noise data to different overlaying positions on said selected input learning data to repeat learning.

5. The recognition apparatus as in claim 4, further comprising:

means for training the recurrent neural network to learn selected input learning data not overlaid with the noise data, and selected portions of the input learning data overlaid with the noise data.

6. The recognition apparatus as in claim 1, further comprising a limiter for converting an internal state value into an external output value between an upper preset limit and a lower preset limit and outputting a symmetrical range of values in both positive and negative directions.

7. The recognition apparatus as in claim 1, wherein said recurrent neural network has a plurality of outputs each of which is corresponding to a said input learning data category.

8. A method for recognizing signals, comprising:

extracting values of an input to be recognized;

inputting the extracted values into a recurrent neural network;

storing input learning data of a plurality of continuous data streams within a plurality of categories;

selecting input learning data of a plurality of continuous data streams to be learned within a plurality of categories;

storing positive output learning data of a plurality of continuous data streams within a plurality of categories corresponding to an input learning data category;

storing negative output learning data of a plurality of continuous data streams within a plurality of categories corresponding to an input learning data category;

selecting output learning data of a plurality of continuous data streams to be learned, each of which corresponds to an input learning data category;

connecting the selected input learning data into a single continuous data stream;

connecting the selected output learning data into a single continuous data stream in correlation with the connection of said input learning data;

inputting said connected input learning data stream to the extraction step; and changing weightings at connections of neuron elements on the basis of outputs of said recurrent neural network and said connected output learning data streams.

9. The method for recognizing signals as in claim 8, wherein the number of said input learning data categories is equal to two.

10. The method for recognizing signals as in claim 8, further comprising:

storing noise data;

overlaying said selected input learning data with noise data selected from the stored noise data, the selected input learning data overlaid with the noise data causing said recurrent neural network to learn so that said noise data contained in said input learning data can be differentiated.

11. The method for recognizing signals as in claim 10, further comprising shifting said noise data to different overlaying positions on said selected input learning data to repeat learning.

12. The method for recognizing signals as in claim 10, wherein selected input learning data not overlaid with the noise data and selected portions of the input learning data overlaid with the noise data are used for learning.

* * * * *